US012202526B2

United States Patent
Hotta et al.

(10) Patent No.: US 12,202,526 B2
(45) Date of Patent: Jan. 21, 2025

(54) VEHICLE CONTROL SYSTEM AND VEHICLE CONTROL METHOD

(71) Applicant: TOYOTA JIDOSHA KABUSHIKI KAISHA, Toyota (JP)

(72) Inventors: Daichi Hotta, Tokyo (JP); Taichi Kawanai, Susono (JP); Yusuke Hayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 472 days.

(21) Appl. No.: 17/684,857

(22) Filed: Mar. 2, 2022

(65) Prior Publication Data
US 2022/0289247 A1 Sep. 15, 2022

(30) Foreign Application Priority Data
Mar. 9, 2021 (JP) ................................. 2021-037744

(51) Int. Cl.
*B60W 60/00* (2020.01)

(52) U.S. Cl.
CPC ..... *B60W 60/0051* (2020.02); *B60W 2555/00* (2020.02); *B60W 2556/65* (2020.02)

(58) Field of Classification Search
CPC ....................... B60W 60/0051; B60W 2556/65
See application file for complete search history.

(56) References Cited

U.S. PATENT DOCUMENTS

| | | | | |
|---|---|---|---|---|
| 2013/0302756 A1* | 11/2013 | Takeuchi | ............. | B60W 30/18 434/64 |
| 2016/0167653 A1* | 6/2016 | Malone | ................. | B60W 10/20 701/23 |
| 2018/0066958 A1* | 3/2018 | Choi | .................. | G01C 21/3697 |
| 2020/0033853 A1* | 1/2020 | Araujo et al. | ........ | G05D 1/0044 |
| 2020/0057436 A1* | 2/2020 | Boda | ........................ | G08G 1/09 |
| 2020/0184591 A1* | 6/2020 | Balu | ...................... | G06Q 50/40 |
| 2020/0209846 A1* | 7/2020 | Chen | .................... | G05D 1/0231 |
| 2020/0348691 A1* | 11/2020 | Fairfield | ............. | B60W 30/182 |
| 2021/0070286 A1* | 3/2021 | Green | .................... | G06V 10/25 |
| 2022/0198199 A1* | 6/2022 | Thibaux | .............. | B60W 60/001 |

(Continued)

FOREIGN PATENT DOCUMENTS

| | | |
|---|---|---|
| JP | 2009-047491 A | 3/2009 |
| JP | 2018-077649 A | 5/2018 |
| JP | 2020-005123 A | 1/2020 |

*Primary Examiner* — Rachid Bendidi
*Assistant Examiner* — Nada Mahyoob Alqaderi
(74) *Attorney, Agent, or Firm* — Dinsmore & Shohl LLP

(57) ABSTRACT

A processor of a vehicle determines whether remote assistance from a remote facility is necessary during autonomous driving control. When determination is made that the remote assistance is necessary, the processor generates a target trajectory of the vehicle that includes an expected waiting position. The expected waiting position is a position where the vehicle is expected to wait for reception of an assistance signal from the remote facility. The processor calculates a traveling efficiency level indicating a level of traveling efficiency required in the vehicle, and calculates, based on the traveling efficiency level, a request timing to transmit a request signal for the remote assistance to the remote facility. When the traveling efficiency level is low in calculation of the request timing, the processor outputs a late timing.

10 Claims, 12 Drawing Sheets

(56) References Cited

U.S. PATENT DOCUMENTS

2022/0203991 A1\* 6/2022 Yamabe .......... B60W 30/18163
2022/0217237 A1\* 7/2022 Sasaki ................. H04M 3/5238
2022/0266871 A1\* 8/2022 Hayashi ................ B60W 40/04

\* cited by examiner

VEHICLE CONTROL SYSTEM AND VEHICLE CONTROL METHOD

CROSS-REFERENCE TO RELATED APPLICATION

This application claims priority to Japanese Patent Application No. 2021-037744 filed on Mar. 9, 2021, incorporated herein by reference in its entirety.

BACKGROUND

1. Technical Field

The present disclosure relates to a vehicle control system and a vehicle control method for a vehicle that receives remote assistance from a remote facility during autonomous driving control.

2. Description of Related Art

Japanese Unexamined Patent Application Publication No. 2018-77649 (JP 2018-77649 A) discloses a system configured to remotely drive an autonomous driving vehicle. This system includes a management facility where an operator who performs remote driving (manual driving) is stationed. The management facility receives a remote control request from the vehicle. For example, the remote control request is transmitted when it is difficult for the system to execute autonomous driving. At the start of remote driving, the management facility determines driving suitability conditions such as operator's driving skill and consciousness. When determination is made that the driving suitability conditions are satisfied, the autonomous driving by the system is temporarily stopped, and the operating entity of the vehicle is switched from the system to the operator.

SUMMARY

In the vehicle in which autonomous driving control is performed, it is expected that no driver is in the vehicle or the driving skill of the driver is low. If the vehicle can be controlled remotely, it is expected that remote control requests will be made frequently during the autonomous driving control. However, human resources of the operators are limited. If many remote control requests are made at the same time, it is difficult to respond to all the requests. This is not desirable because the vehicles continue to stop on roads to wait for remote control and hinder traffic. Therefore, technological development is demanded to avoid such a situation.

The present disclosure provides a technology capable of reducing the frequency of transmission of remote control requests from a vehicle in which autonomous driving control is performed.

A first aspect of the present disclosure relates to a vehicle control system for a vehicle configured to receive remote assistance from a remote facility during autonomous driving control. The vehicle control system includes a memory and a processor. The memory is configured to store driving environment data of the vehicle. The processor is configured to generate a target trajectory of the vehicle based on the driving environment data. The processor is configured to execute the autonomous driving control based on the target trajectory. The processor is configured to, as the autonomous driving control, determine whether the remote assistance is necessary based on at least one of the driving environment data and the target trajectory, generate, when determination is made that the remote assistance is necessary, the target trajectory including an expected waiting position where the vehicle is expected to wait for reception of an assistance signal from the remote facility, calculate, based on the driving environment data, a traveling efficiency level indicating a level of traveling efficiency required in the vehicle, calculate, based on the traveling efficiency level, a request timing to transmit a request signal for the remote assistance to the remote facility, transmit the request signal to the remote facility when the request timing has come. The processor is configured to output a late timing when the traveling efficiency level is low in calculation of the request timing. The late timing is later than a fast timing. The fast timing is a timing when the traveling efficiency level is high.

According to the first aspect, when determination is made that the remote assistance is necessary, the request timing is calculated based on the traveling efficiency level. When the traveling efficiency level is low in the calculation of the request timing, the later timing is output as compared with the case where the traveling efficiency level is high. Therefore, the request timing can be delayed when the traveling efficiency level is low. When the request timing is delayed, it is expected that the driving environment of the vehicle will change before the request timing comes, and the determination that the remote assistance is necessary will change. When the determination changes, the request signal is not transmitted. Therefore, the frequency of transmission of the request signal can be reduced.

In the first aspect, the vehicle control system may further include a database. The database may store map data. The processor may be configured to, as the autonomous driving control, calculate, based on the traveling efficiency level, a waiting period to wait for the assistance signal from the remote facility at the expected waiting position, determine whether the waiting period is larger than a permissible period, determine, when determination is made that the waiting period is larger than the permissible period, whether the expected waiting position is appropriate as a temporary stop position based on at least one of the driving environment data and the map data, and generate, when determination is made that the expected waiting position is not appropriate as the temporary stop position, a corrected target trajectory in which the expected waiting position is corrected.

According to the configuration described above, when determination is made that the waiting period calculated based on the traveling efficiency level is larger than the permissible period, determination is made as to whether the expected waiting position is appropriate as the temporary stop position. When determination is made that the expected waiting position is not appropriate as the temporary stop position, the target trajectory in which the expected waiting position is corrected is generated. Therefore, it is possible to generate the target trajectory including the expected waiting position appropriate as the temporary stop position. Since the waiting period is the period to wait for the assistance signal from the remote facility at the expected waiting position, the temporary stop of the vehicle hinders traffic when the waiting period increases. When the waiting period is larger than the permissible period, the target trajectory including the appropriate expected waiting position is generated. Thus, it is possible to avoid such a problem.

In the first aspect, the driving environment data may have external condition data of the vehicle. The processor may be configured to output a high level when the external condition data includes recognition data of a succeeding vehicle behind the vehicle in calculation of the traveling efficiency level. The high level may be higher than a low level. The low level may be a level when the external condition data does not include the recognition data of the succeeding vehicle behind the vehicle.

In the first aspect, the driving environment data may have internal condition data of the vehicle. The processor may be configured to output a high level when the internal condition data includes boarding data indicating that an occupant is in the vehicle in calculation of the traveling efficiency level. The high level may be higher than a low level. The low level may be a level when the internal condition data does not have the boarding data indicating that the occupant is in the vehicle.

In the first aspect, the driving environment data may have internal condition data of the vehicle. The internal condition data may have data on a possible cruising distance of the vehicle. The processor may be configured to output a higher level as the possible cruising distance decreases in calculation of the traveling efficiency level.

In the first aspect, the driving environment data may have operating condition data of a transportation service for a passenger to be provided by the vehicle. The operating condition data may have data on a delay period from a scheduled operation time of the transportation service. The processor may be configured to output a higher level as the delay period increases in calculation of the traveling efficiency level.

In the first aspect, the driving environment data may have operating condition data of a transportation service for a passenger to be provided by the vehicle. The operating condition data may have data on a reward to be given by the passenger for the transportation service. The processor may be configured to output a higher level as the reward increases in calculation of the traveling efficiency level.

In the first aspect, the driving environment data may have traffic condition data on a route from a current location of the vehicle to a destination. The processor may be configured to output a high level when the traffic condition data has data on a traffic jam occurring on the route in calculation of the traveling efficiency level. The high level may be higher than a low level. The low level may be a level when the traffic condition data does not have the data on the traffic jam occurring on the route.

According to the configuration described above, the traveling efficiency level can be calculated based on various types of data in the driving environment data.

A second aspect of the present disclosure relates to a vehicle control method for a vehicle configured to receive remote assistance from a remote facility during autonomous driving control. The vehicle control method is executed by a processor of the vehicle. The processor is configured to generate a target trajectory of the vehicle based on driving environment data of the vehicle, and execute the autonomous driving control based on the target trajectory. The vehicle control method includes determining whether the remote assistance is necessary based on at least one of the driving environment data and the target trajectory, generating, when determination is made that the remote assistance is necessary, the target trajectory including an expected waiting position where the vehicle is expected to wait for reception of an assistance signal from the remote facility, calculating, based on the driving environment data, a traveling efficiency level indicating a level of traveling efficiency required in the vehicle, calculating, based on the traveling efficiency level, a request timing to transmit a request signal for the remote assistance to the remote facility, transmitting the request signal to the remote facility when the request timing has come, and outputting a late timing when the traveling efficiency level is low in calculation of the request timing, the late timing being later than a fast timing, the fast timing being a timing when the traveling efficiency level is high.

According to the second aspect, when determination is made that the remote assistance is necessary, the request timing is calculated based on the traveling efficiency level. When the traveling efficiency level is low in the calculation of the request timing, the later timing is output as compared with the case where the traveling efficiency level is high. Therefore, the request timing can be delayed when the traveling efficiency level is low. When the request timing is delayed, it is expected that the driving environment of the vehicle will change before the request timing comes, and the determination that the remote assistance is necessary will change. When the determination changes, the request signal is not transmitted. Therefore, the frequency of transmission of the request signal can be reduced.

In the second aspect, the vehicle control method may include, by the processor, calculating, based on the traveling efficiency level, a waiting period to wait for the assistance signal from the remote facility at the expected waiting position, determining whether the waiting period is larger than a permissible period, determining, when determination is made that the waiting period is larger than the permissible period, whether the expected waiting position is appropriate as a temporary stop position based on at least one of the driving environment data and map data stored in a database, and generating, when determination is made that the expected waiting position is not appropriate as the temporary stop position, a corrected target trajectory in which the expected waiting position is corrected.

According to the configuration described above, when determination is made that the waiting period calculated based on the traveling efficiency level is larger than the permissible period, determination is made as to whether the expected waiting position is appropriate as the temporary stop position. When determination is made that the expected waiting position is not appropriate as the temporary stop position, the target trajectory in which the expected waiting position is corrected is generated. Therefore, it is possible to generate the target trajectory including the expected waiting position appropriate as the temporary stop position. Since the waiting period is the period to wait for the assistance signal from the remote facility at the expected waiting position, the temporary stop of the vehicle hinders traffic when the waiting period increases. When the waiting period is larger than the permissible period, the target trajectory including the appropriate expected waiting position is generated. Thus, it is possible to avoid such a problem.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
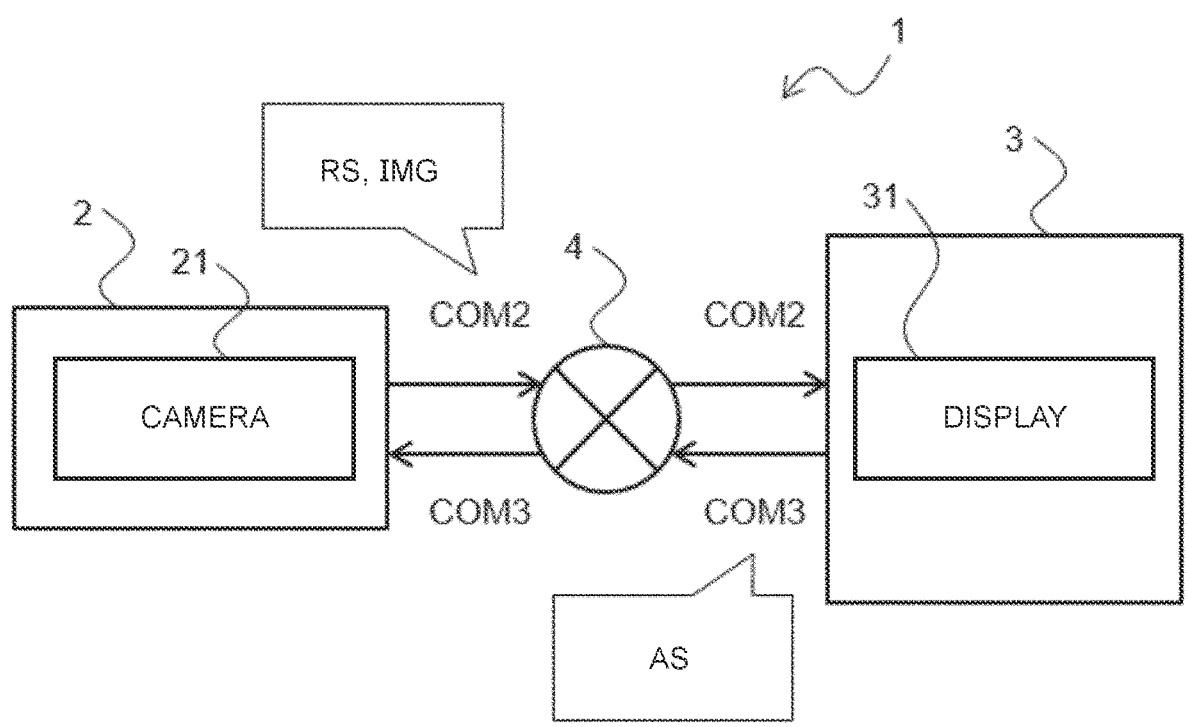
FIG. 1 is a diagram illustrating a configuration example of a remote assistance system to which a vehicle control system according to a first embodiment is applied.

Vehicle control systems according to embodiments of the present disclosure will be described below with reference to the drawings. Vehicle control methods according to the embodiments are implemented by computer processes to be performed in the vehicle control systems according to the embodiments. In the drawings, the same or corresponding portions will be represented by the same reference signs, and their description will be simplified or omitted.

1. First Embodiment

First, a first embodiment of the present disclosure will be described with reference to FIGS. 1 to 11.

1-1. Outline of First Embodiment 1-1-1. Remote Assistance

FIG. 1 is a diagram illustrating a configuration example of a remote assistance system to which a vehicle control system according to the first embodiment is applied. The remote assistance system 1 illustrated in FIG. 1 includes a vehicle 2 and a remote facility 3 that communicates with the vehicle 2. The vehicle 2 and the remote facility 3 communicate with each other via a network 4. In this communication, communication data COM2 is transmitted from the vehicle 2 to the remote facility 3. Communication data COM3 is transmitted from the remote facility 3 to the vehicle 2.

Examples of the vehicle 2 include an automobile powered by an internal combustion engine such as a diesel engine or a gasoline engine, an electric vehicle powered by an electric motor, or a hybrid vehicle including the internal combustion engine and the electric motor. The electric motor is driven by a battery such as a secondary battery, a hydrogen fuel cell, a metal fuel cell, or an alcohol fuel cell.

Driving of the vehicle 2 is performed by the vehicle control system according to the first embodiment. For example, the vehicle control system performs vehicle control that assists manual driving by a driver of vehicle 2, or vehicle control for autonomous driving of vehicle 2. The former is collectively referred to as "driving assistance control", and the latter is collectively referred to as "autonomous driving control". Examples of the driving assistance control include collision avoidance control and lane departure suppression control. The collision avoidance control assists avoidance of a collision between the vehicle 2 and a surrounding object. The lane deviation suppression control suppresses deviation of the vehicle 2 from a traveling lane.

The first embodiment is directed to a case where the autonomous driving control is performed based on a target trajectory of the vehicle 2. The target trajectory is a set of target positions of the vehicle 2 at a plurality of future reference timings set at predetermined time intervals. The target trajectory may include a target speed of the vehicle 2 at each target position. In the autonomous driving control, deviation between the vehicle 2 and the target trajectory (for example, lateral deviation, yaw angle deviation, or speed deviation) is calculated, and the vehicle 2 is controlled to reduce the deviation.

During the autonomous driving control, the vehicle control system determines whether remote assistance from an operator is necessary. When determination is made that the remote assistance is necessary, the vehicle control system transmits a remote assistance request signal RS to the remote facility 3. The request signal RS is included in the communication data COM2.

The vehicle 2 includes at least a camera 21. The camera 21 captures an image (moving image) of an external condition of the vehicle 2. The camera 21 is provided to capture an image of the periphery of the vehicle 2 (for example, front and rear images). Image data IMG acquired by the camera 21 is typically moving image data. The image data IMG may be still image data. When determination is made that the remote assistance is necessary, the vehicle control system transmits the image data IMG to the remote facility 3. The communication data COM2 also includes the image data IMG.

When the remote facility 3 receives the request signal RS from the vehicle control system, the remote facility 3 remotely assists traveling of the vehicle 2 based on operations of the operator. The remote facility 3 includes at least a display 31. Examples of the display 31 include a liquid crystal display (LCD) and an organic electroluminescence (EL) (organic light emitting diode (OLED)) display.

During the remote assistance from the operator, the remote facility 3 causes the display 31 to display the image data IMG received from the vehicle 2. The operator grasps the external condition of the vehicle 2 based on the image data IMG displayed on the display 31, and inputs an assistance instruction for the vehicle 2. The remote facility 3 generates an assistance signal AS based on the assistance instruction, and transmits the assistance signal AS to the vehicle 2. The assistance signal AS is included in the communication data COM3.

Examples of the remote assistance from the operator include recognition assistance and determination assistance. When the autonomous driving control is performed and, for example, a traffic light ahead of the vehicle 2 is exposed to sunlight, the recognition accuracy of lighting statuses of light emitting parts (for example, green, yellow, and red light emitting parts) of the traffic light decreases. When the lighting statuses cannot be recognized, it is difficult to determine what kind of action to take at what timing. In such a case, the recognition assistance is performed for the lighting statuses, and/or the determination assistance is performed for the action of the vehicle 2 based on the lighting statuses recognized by the operator.

The remote assistance from the operator also includes remote driving. In the remote driving, the operator refers to the image data IMG displayed on the display 31 to perform a driving operation on the vehicle 2, including at least one of steering, acceleration, and deceleration. In this case, the assistance instruction from the operator indicates details of the driving operation of the vehicle 2. The remote facility 3 generates an assistance signal AS based on the details of the driving operation, and transmits the assistance signal AS to the vehicle 2. The vehicle control system performs a driving operation on the vehicle 2, including at least one of steering, acceleration, and deceleration, in response to the assistance signal AS.

The period required from the transmission of the communication data COM2 including the request signal RS to the reception of the communication data COM3 including the assistance signal AS transmitted in response to the request signal RS varies depending on a communication speed factor such as a communication standard and a frequency band in use. This required period is set separately in consideration of the communication speed factor.

1-1-2. Request Signal Transmission Timing

Figure 2:
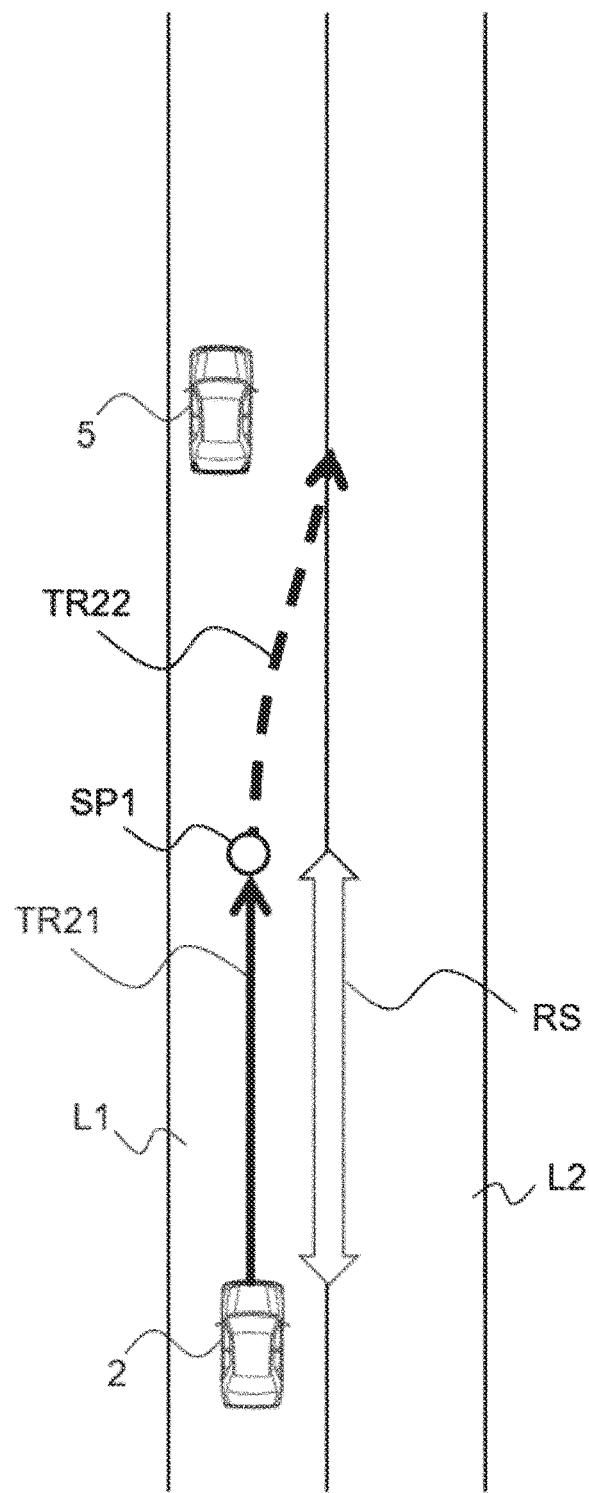
FIG. 2 is a diagram illustrating a first transmission example of a remote assistance request signal transmitted from a vehicle during autonomous driving control.

FIG. 2 is a diagram illustrating a first transmission example of the request signal RS transmitted from the vehicle 2 during the autonomous driving control. FIG. 2 illustrates the vehicle 2 traveling along a lane L1. For example, a lane L2 adjacent to the lane L1 is a lane for vehicles (oncoming vehicles) traveling in a direction opposite to a traveling direction of the vehicle 2. FIG. 2 illustrates a stopped vehicle 5 in the lane L1 ahead of the vehicle 2. The stopped vehicle 5 is an obstacle that hinders the traveling of the vehicle 2 along the lane L1, and corresponds to an object (avoidance target) that needs to avoid a collision with the vehicle 2.

Target trajectories TR21 and TR22 illustrated in FIG. 2 are examples of target trajectories to be generated by the vehicle control system. In the first example, the vehicle control system recognizes the stopped vehicle 5 as the avoidance target. The target trajectory TR21 is a target trajectory for the vehicle 2 to temporarily stop behind the stopped vehicle 5. A stop position SP1 is a target position corresponding to the distal end of the target trajectory TR21. The target trajectory TR22 is a target trajectory for the vehicle 2 to pass by the stopped vehicle 5. The target trajectory TR22 may be generated simultaneously with the generation of the target trajectory TR21, or may be generated while the vehicle 2 is traveling along the target trajectory TR21.

When determination is made that the remote assistance is necessary, the vehicle control system transmits a remote assistance request signal RS. For example, determination is made that the remote assistance is necessary when the recognition accuracy of the stopped vehicle 5 or the recognition accuracy of the periphery of the stopped vehicle 5 is low. In another example, determination is made that the remote assistance is necessary when the safety of the target trajectory TR22 is not guaranteed. When the request signal RS is transmitted, the vehicle control system selects the target trajectory TR21, and performs the autonomous driving control along the target trajectory TR21.

In this case, the request signal RS is transmitted at an arbitrary timing during the traveling along the target trajectory TR21, or at a timing when the vehicle 2 reaches the stop position SP1. The request signal RS may be transmitted after the timing when the vehicle 2 reaches the stop position SP1.

Figure 3:
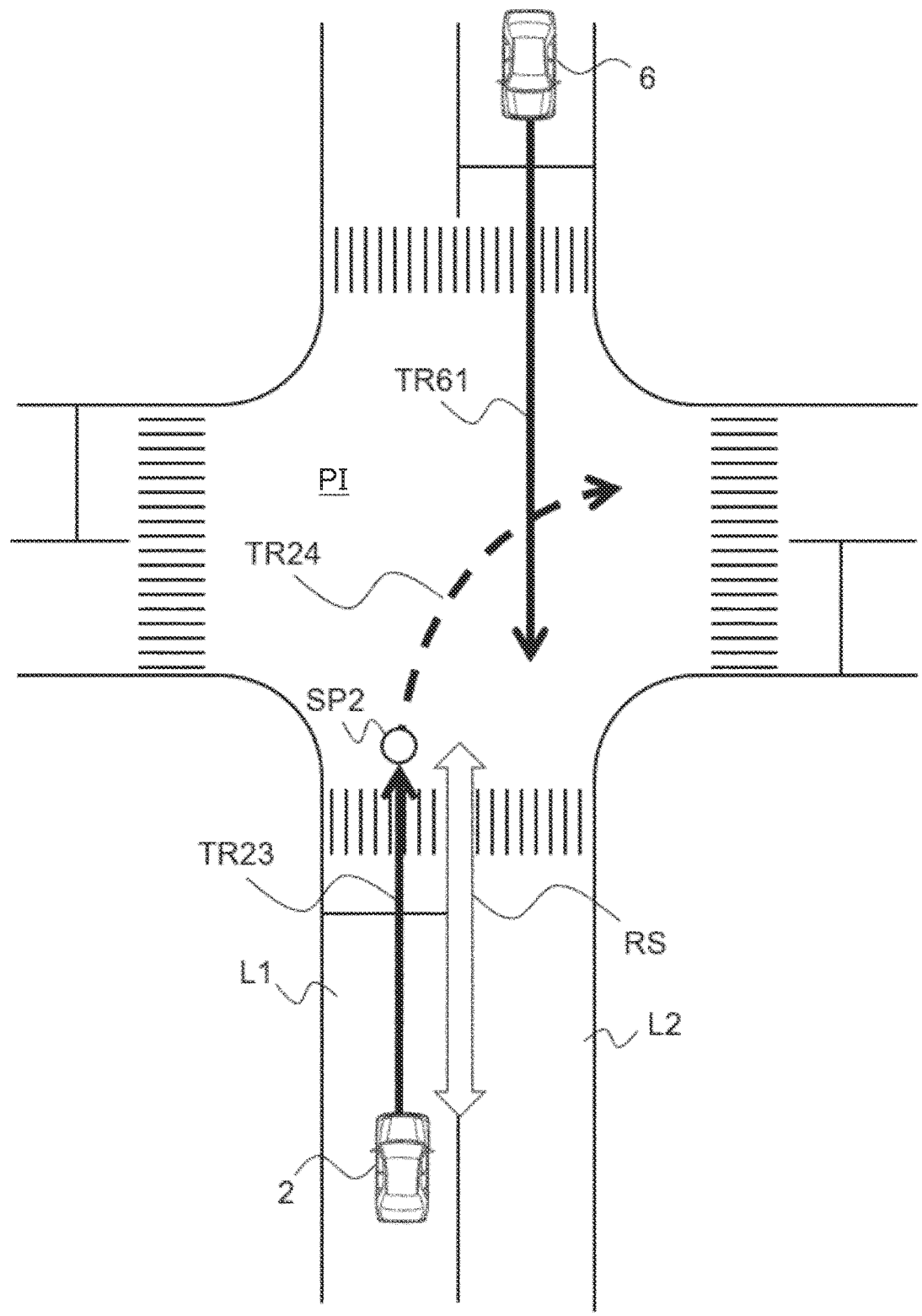
FIG. 3 is a diagram illustrating a second transmission example of the request signal transmitted from the vehicle during the autonomous driving control.

FIG. 3 is a diagram illustrating a second transmission example of the request signal RS transmitted from the vehicle 2 during the autonomous driving control. FIG. 3 illustrates the vehicle 2 traveling along the lane L1. The vehicle 2 is expected to enter an intersection PI. FIG. 3 illustrates an oncoming vehicle 6 on an opposite side of the intersection PI with respect to the vehicle 2. Similarly to the vehicle 2, the oncoming vehicle 6 is expected to enter the intersection PI.

Target trajectories TR23 and TR24 illustrated in FIG. 3 are examples of target trajectories to be generated by the vehicle control system. The target trajectory TR23 is a target trajectory for the vehicle 2 to temporarily stop at the intersection PI. A stop position SP2 is a target position corresponding to the distal end of the target trajectory TR23. The target trajectory TR24 is a target trajectory for the vehicle 2 to turn right at the intersection PI. The target trajectory TR24 may be generated simultaneously with the generation of the target trajectory TR23, or may be generated while the vehicle 2 is traveling along the target trajectory TR23.

In the second example, the vehicle control system recognizes the oncoming vehicle 6. A predicted trajectory TR61 is an example of a future trajectory of the oncoming vehicle 6. The predicted trajectory TR61 is predicted by the vehicle control system when the target trajectory TR23 is generated. For example, the predicted trajectory TR61 is predicted based on a behavior model of various moving objects such as a four-wheel vehicle, a two-wheel vehicle, and a pedestrian. The behavior model is preset based on behavior patterns of various moving objects.

Similarly to the first example, determination is made in the second example as to whether the remote assistance is necessary. For example, determination is made that the remote assistance is necessary when collision conditions are satisfied. Examples of the collision conditions include an intersection condition and a proximity condition. The intersection condition is satisfied when the target trajectory TR24 and the predicted trajectory TR61 intersect each other. The proximity condition is satisfied when a difference between a timing at which the vehicle 2 reaches the intersection position and a timing at which the oncoming vehicle 6 reaches the intersection position is within a predetermined period. When the request signal RS is transmitted, the vehicle control system selects the target trajectory TR23, and performs the autonomous driving control along the target trajectory TR23.

In this case, the request signal RS is transmitted at an arbitrary timing during the traveling along the target trajectory TR23, or at a timing when the vehicle 2 reaches the stop position SP2. The request signal RS may be transmitted after the timing when the vehicle 2 reaches the stop position SP2.

1-1-3. Traveling Efficiency Level

As described with reference to FIGS. 2 and 3, the transmission timing of the request signal RS (hereinafter referred to also as "request timing RT") can be set to an arbitrary timing after the timing when determination is made that the remote assistance is necessary. The request timing RT set to an arbitrary timing has advantages and disadvantages. For example, when the remote driving is performed by the operator, smooth transition from the autonomous driving control to the remote driving can be achieved by setting an earlier request timing RT. When the recognition assistance or the determination assistance is performed, the operator has an allowance to grasp the surrounding environment. When the request timing RT is set earlier, the operator is engaged in a single remote assistance for a longer period. Therefore, when a plurality of request signals RS is received, it is difficult for the operator to respond to all the request signals RS.

Figure 4:
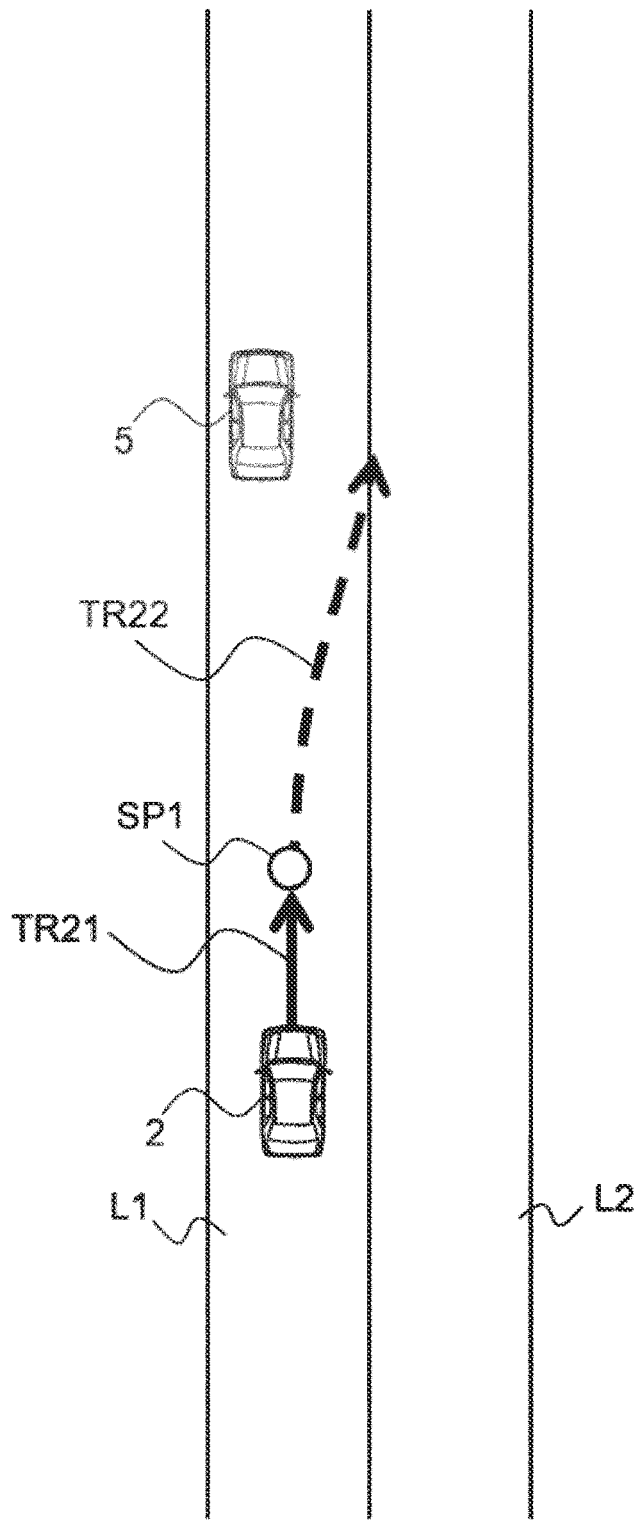
FIG. 4 is a diagram illustrating a disadvantage when a transmission timing of the request signal is delayed in the first transmission example illustrated in FIG. 2.

Advantages and disadvantages when the request timing RT is delayed will be described with reference to FIGS. 4 and 5. FIG. 4 is a diagram illustrating a disadvantage when the request timing RT is delayed in the first transmission example illustrated in FIG. 2. Comparison between FIG. 4 and FIG. 2 demonstrates that the position of the vehicle 2 illustrated in FIG. 4 is closer to the stop position SP1 than that illustrated in FIG. 2. When the request timing RT is delayed, a period to wait for the assistance signal AS at the stop position SP1 increases. When the waiting period increases, the vehicle 2 hinders traffic. In addition, the driver or passenger of the vehicle 2 may feel uncomfortable with this waiting situation.

Figure 5:
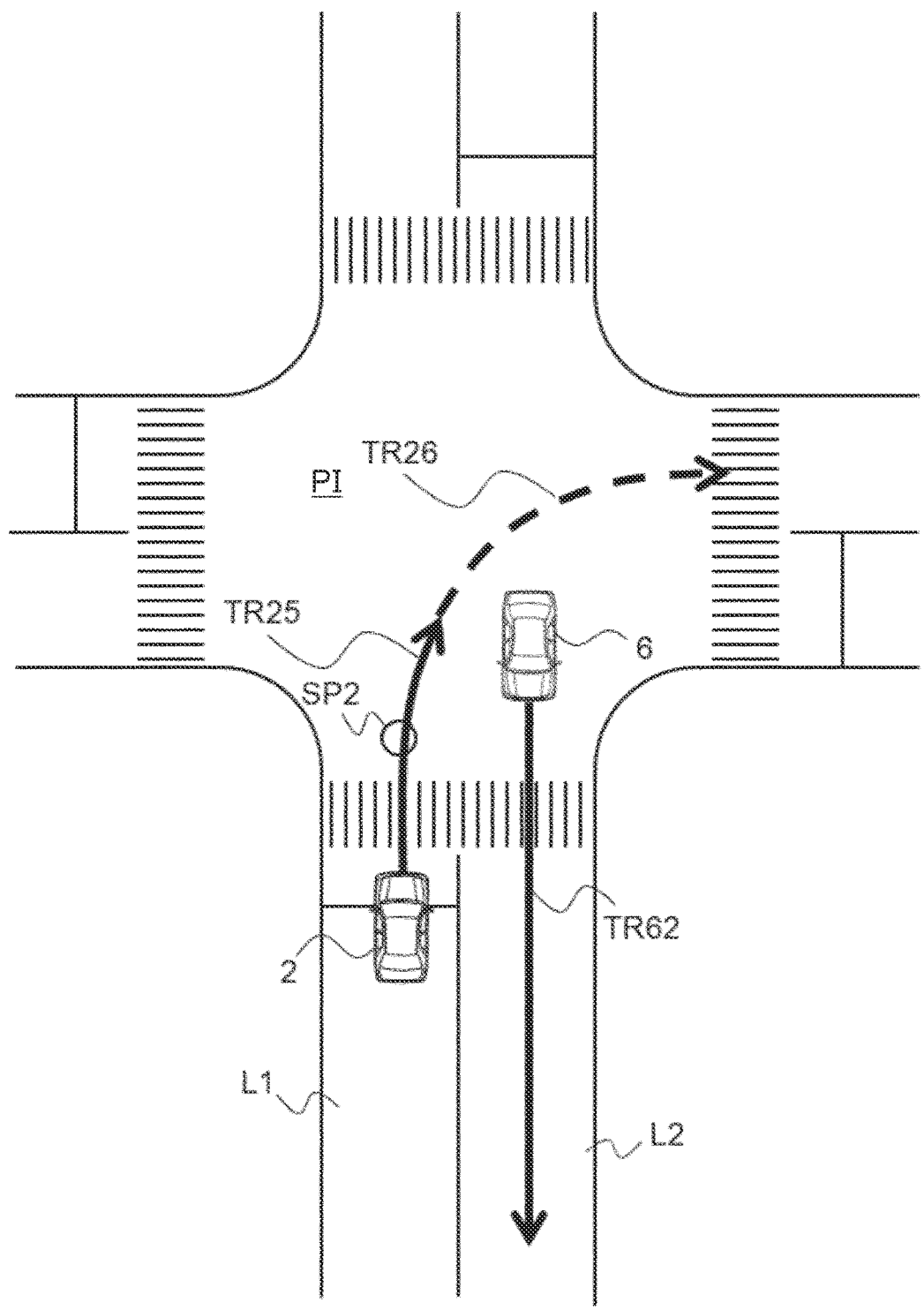
FIG. 5 is a diagram illustrating an advantage when a transmission timing of the request signal is delayed in the second transmission example illustrated in FIG. 3.

FIG. 5 is a diagram illustrating an advantage when the request timing RT is delayed in the second transmission example illustrated in FIG. 3. Comparison between FIG. 5 and FIG. 3 demonstrates that the position of the vehicle 2 illustrated in FIG. 5 is closer to the stop position SP2 than that illustrated in FIG. 3. The oncoming vehicle 6 is about to enter the lane L2 after passing through an intermediate position of the intersection PI.

When the request timing RT is delayed, the determination result that the remote assistance is necessary may change. When the determination result changes, the autonomous driving control can be continued without resort to the remote assistance. Target trajectories TR25 and TR26 illustrated in FIG. 5 are target trajectories for the vehicle 2 entering the intersection PI to turn right without a temporary stop. A predicted trajectory TR62 is an example of a future trajectory of the oncoming vehicle 6 that is predicted by the vehicle control system when the target trajectory TR25 is generated.

In view of the advantages and disadvantages, the request timing RT is calculated based on "traveling efficiency level EL" in the first embodiment. The traveling efficiency level EL is a level of traveling efficiency required in the vehicle 2. The "traveling efficiency" is defined as the ratio between a period WT to wait for the reception of the assistance signal AS at an expected waiting position WP (hereinafter referred to also as "waiting period") and a traveling distance of the vehicle 2 in the waiting period WT. The expected waiting position WP is a position where the vehicle 2 is expected to wait for the reception of the assistance signal AS. Examples of the expected waiting position WP include a temporary stop position of the vehicle 2 in the target trajectory. That is, the stop positions SP1 and SP2 described with reference to FIGS. 2 and 3 correspond to specific examples of the expected waiting position WP.

Figure 6:
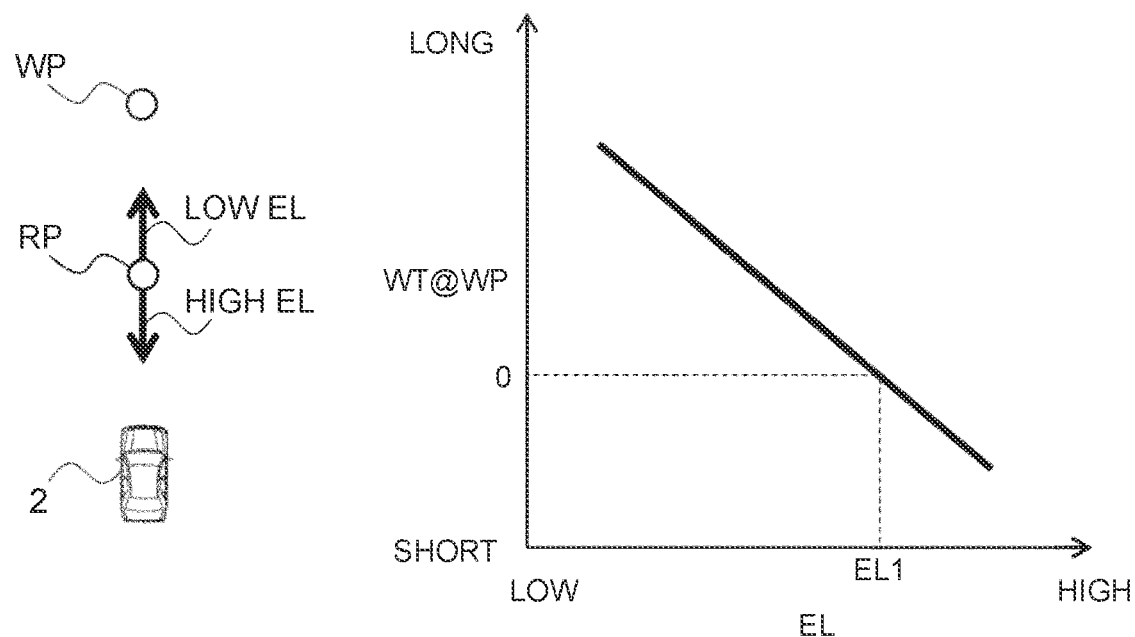
FIG. 6 is a diagram illustrating an example of a relationship between a traveling efficiency level and a period to wait for reception of an assistance signal at an expected waiting position.

FIG. 6 is a diagram illustrating an example of a relationship between the traveling efficiency level EL and the waiting period WT (WT@WP). As illustrated in FIG. 6, the waiting period WT decreases as the traveling efficiency level EL increases. When the traveling efficiency level EL is equal to "EL1", the waiting period WT is "0". The waiting period WT of "0" means that the assistance signal AS is received at a timing when the vehicle 2 reaches the expected waiting position WP. When the traveling efficiency level EL is higher than "EL1", the waiting period WT is a value smaller than "0". The waiting period WT smaller than "0" means that the assistance signal AS is received at a timing before the timing when the vehicle 2 reaches the expected waiting position WP.

A left part of FIG. 6 illustrates a relationship between the traveling efficiency level EL and a position where the request signal RS is transmitted. As described above, when the traveling efficiency level EL is high, there is a strong possibility that the assistance signal AS is received at a timing before the timing when the vehicle 2 reaches the expected waiting position WP. Therefore, the position where the request signal RS is transmitted (hereinafter referred to also as "request position RP") is farther from the expected waiting position WP as the traveling efficiency level EL increases. The request position RP is closer to the expected waiting position WP as the traveling efficiency level EL decreases.

According to the first embodiment, the request signal RS is transmitted at the timing calculated based on the traveling efficiency level EL. Therefore, it is possible to receive the assistance signal AS by transmitting the request signal RS to the remote facility 3 at the optimum timing set in consideration of a driving environment such as an external or internal condition of the vehicle 2. Therefore, it is possible to maximize the advantages or minimize the disadvantages of the setting of the request timing RT to an arbitrary timing. An example of the driving environment will be described later.

The vehicle control system according to the first embodiment and the remote assistance system including the vehicle control system will be described below in detail.

1-2. Remote Assistance System 1-2-1. Configuration Example of Vehicle

Figure 7:
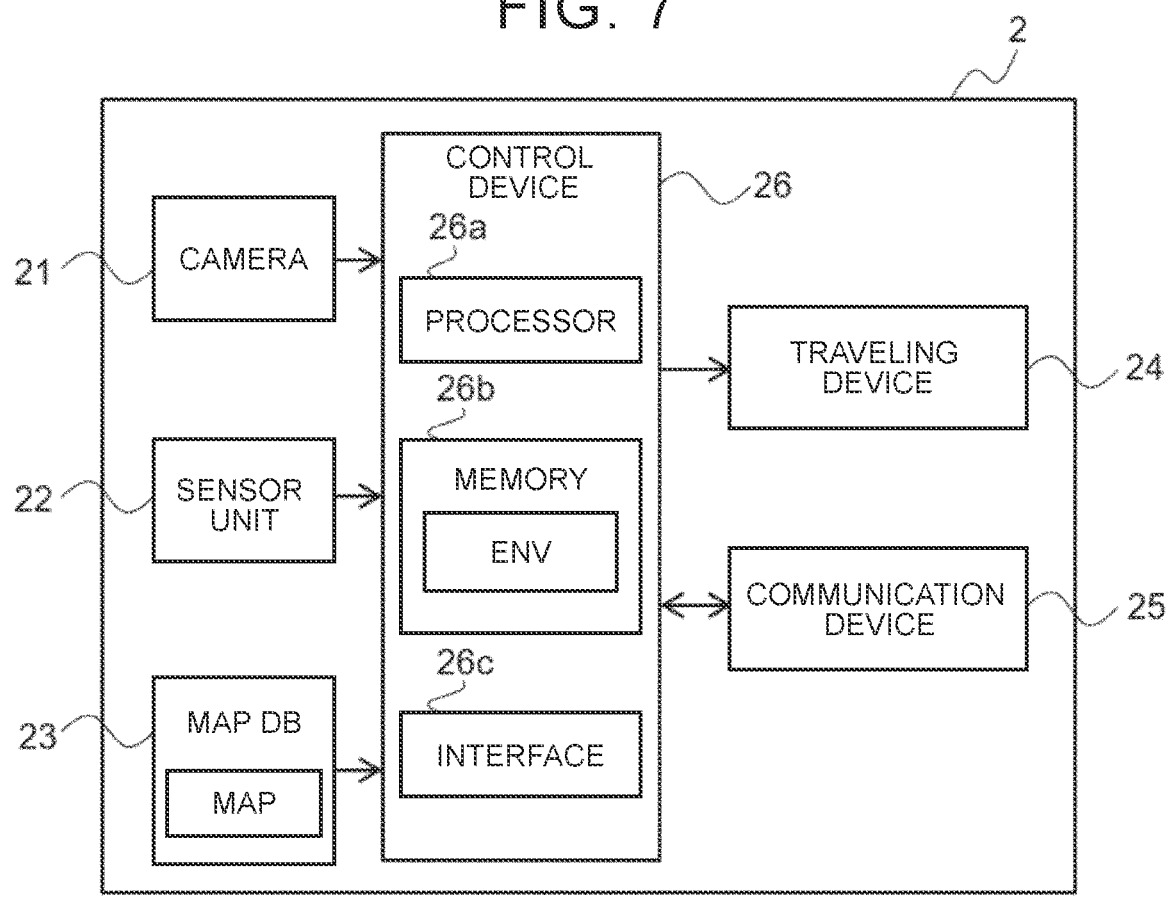
FIG. 7 is a block diagram illustrating a configuration example of the vehicle illustrated in FIG. 1.

FIG. 7 is a block diagram illustrating a configuration example of the vehicle 2 illustrated in FIG. 1. As illustrated in FIG. 7, the vehicle 2 includes the camera 21, a sensor unit 22, a map database (map DB) 23, a traveling device 24, a communication device 25, and a control device 26. These elements constitute the vehicle control system according to the first embodiment. The camera 21, the sensor unit 22, the map database 23, the traveling device 24, and the communication device 25 are connected to the control device 26 via, for example, an in-vehicle network (for example, a car area network (CAN)). The camera 21 has already been described with reference to FIG. 1.

The sensor unit 22 includes a condition sensor that detects a condition of the vehicle 2. Examples of the condition sensor include a speed sensor, an acceleration sensor, a yaw rate sensor, and a steering angle sensor. The sensor unit 22 also includes a position sensor that detects a position and an orientation of the vehicle 2. Examples of the position sensor include a global navigation satellite system (GNSS) sensor. The sensor unit 22 may further include a recognition sensor other than the camera 21. The recognition sensor recognizes (detects) an external condition of the vehicle 2 by using radio waves or light. Examples of the recognition sensor include a millimeter-wave radar and a laser imaging, detection, and ranging (LIDAR) sensor.

The map database (map DB) 23 stores map data MAP. Examples of the map data MAP include road position data, road shape data (for example, types of curve and straight road), and position data of intersections and structures. The map data MAP also includes traffic control data. The map database 23 is formed in an in-vehicle storage device (for example, a hard disk drive or a flash memory). The map database 23 may be formed in a computer of a facility (for example, the remote facility 3) communicable with the vehicle 2.

The traveling device 24 includes a steering device, a driving device, and a braking device. The steering device turns tires of the vehicle 2. For example, the steering device includes a power steering (electric power steering (EPS)) system. The driving device is a driving power source that generates a driving force. Examples of the driving device include an electric motor and an internal combustion engine. The braking device generates a braking force.

The communication device 25 performs wireless communication with a base station (not illustrated) in the network 4. Examples of a communication standard for the wireless communication include mobile communication standards such as 4th Generation (4G), Long Term Evolution (LTE), and 5th Generation (5G). Connection destinations of the communication device 25 include the remote facility 3. In communication with the remote facility 3, the communication device 25 transmits, to the remote facility 3, the communication data COM2 received from the control device 26.

The control device 26 includes a microcomputer including at least one processor 26a, at least one memory 26b, and an interface 26c. The processor 26a includes a central processing unit (CPU). The memory 26b is a volatile memory such as a double data rate (DDR) memory, and loads a program to be used by the processor 26a and temporarily stores various types of data. The memory 26b stores various types of data acquired by the vehicle 2. The various types of data include driving environment data ENV of the vehicle 2. The interface 26c is an interface with external devices such as the camera 21 and the sensor unit 22.

Figure 8:
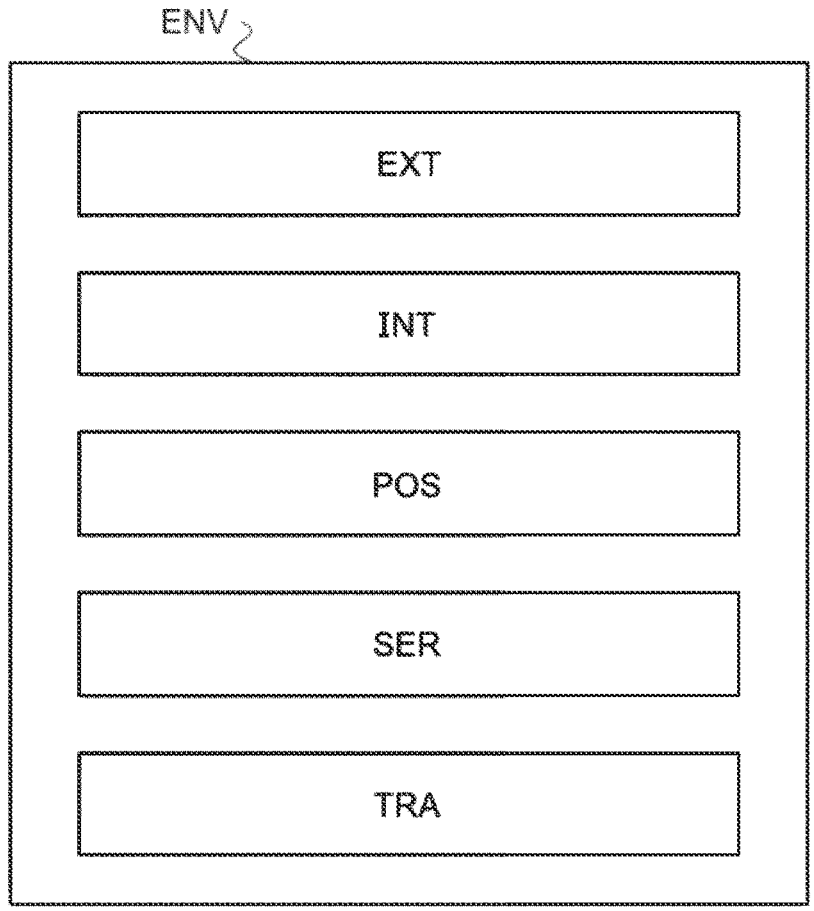
FIG. 8 is a diagram illustrating an example of driving environment data.

An example of the driving environment data ENV will be described with reference to FIG. 8. As illustrated in FIG. 8, the driving environment data ENV includes external condition data EXT, internal condition data INT, position/orientation data POS, operating condition data SER, and traffic condition data TRA.

Examples of the external condition data EXT include the image data IMG acquired by the camera 21, and recognition data acquired by the recognition sensor.

Examples of the internal condition data INT include condition data of the vehicle 2 that is acquired by the condition sensor. The internal condition data INT may include boarding data indicating that an occupant is in the vehicle 2. The internal condition data INT may include data indicating a possible cruising distance of the vehicle 2. When the vehicle 2 is powered by an electric motor, the possible cruising distance is calculated based on the remaining battery level. When the vehicle 2 is powered by an internal combustion engine, the possible cruising distance is calculated based on the remaining fuel amount.

The position/orientation data POS indicates a position and an orientation of the vehicle 2 that are acquired by the position sensor.

The operating condition data SER indicates an operating condition of a transportation service when the vehicle 2 provides the transportation service for passengers. Examples of the vehicle 2 that provides the transportation service include a transit bus that travels on a predetermined route in accordance with a predetermined timetable, and an on-demand bus that travels on a route from a user's departure point to a destination in response to a request from the user. Examples of the operating condition data SER in the former case include data on a delay period from a scheduled operation time of the transportation service. Examples of the operating condition data SER in the latter case include data on a reward to be given by the user for the transportation service. For example, the operating condition data SER is acquired from a server that manages the transportation service.

The traffic condition data TRA indicates a traffic condition on a route from a current location of the vehicle 2 to a destination. Examples of the traffic condition data TRA include data on a traffic jam occurring on the route from the current location of the vehicle 2 to the destination. Examples of the traffic jam data include data on a length from a start point to an end point of the traffic jam (traffic jam length), and data on an estimated period for the end of the traffic jam. For example, the traffic condition data TRA is acquired from a center that collects and edits traffic information and provides the traffic information to the outside.

1-2-2. Configuration Example of Remote Facility

Figure 9:
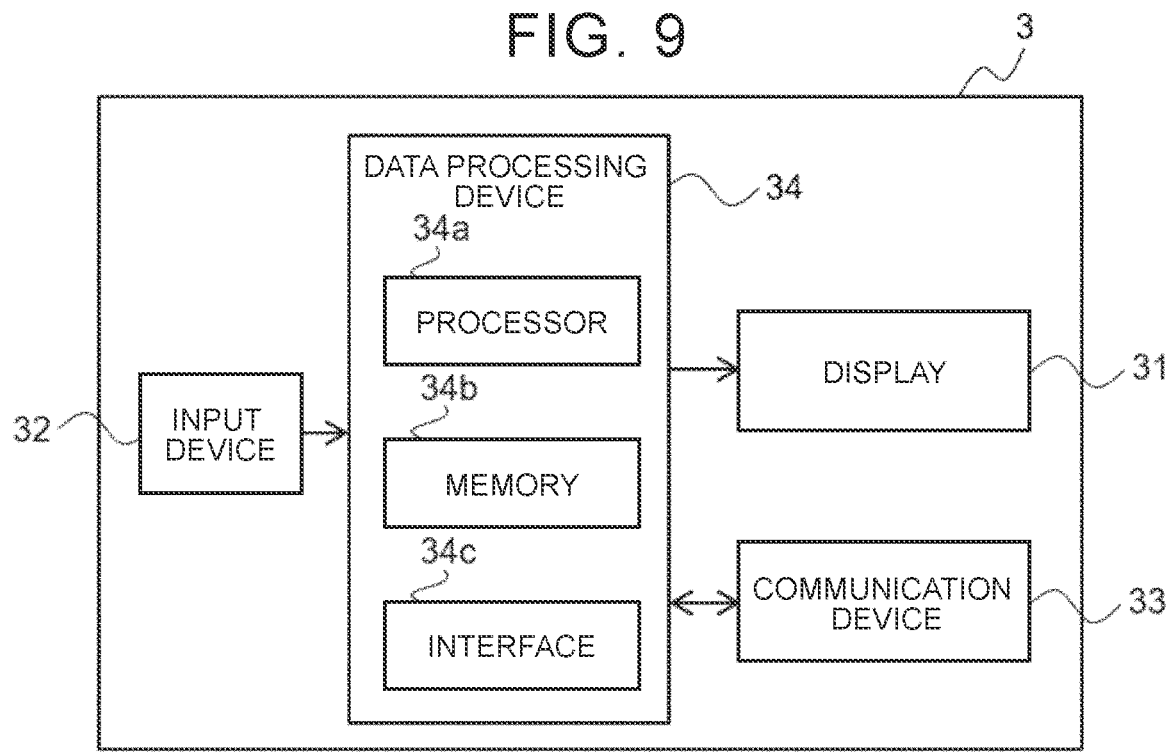
FIG. 9 is a block diagram illustrating a configuration example of a remote facility illustrated in FIG. 1.

FIG. 9 is a block diagram illustrating a configuration example of the remote facility 3 illustrated in FIG. 1. As illustrated in FIG. 9, the remote facility 3 includes the display 31, an input device 32, a communication device 33, and a data processing device 34. The display 31, the input device 32, and the communication device 33 are connected to the data processing device 34 via a dedicated network. The display 31 has already been described with reference to FIG. 1.

The input device 32 is operated by the operator of the remote facility 3. For example, the input device 32 includes an input unit that receives an input by the operator, and a control circuit that generates and outputs the assistance signal AS based on the input. Examples of the input unit include a touch panel, a mouse, a keyboard, a button, and a switch. Examples of the input by the operator include a movement operation for a cursor displayed on the display 31, and a selection operation for a button displayed on the display 31.

When the operator remotely drives the vehicle 2, the input device 32 may include an input device for traveling. Examples of the input device for traveling include a steering wheel, a shift lever, an accelerator pedal, and a brake pedal.

The communication device 33 performs wireless communication with a base station in the network 4. Examples of a communication standard for the wireless communication include mobile communication standards such as 4G, LTE, and 5G. Communication destinations of the communication device 33 include the vehicle 2. In communication with the vehicle 2, the communication device 33 transmits, to the vehicle 2, the communication data COM3 received from the data processing device 34.

The data processing device 34 is a computer for processing various types of data. The data processing device 34 includes at least one processor 34a, at least one memory 34b, and an interface 34c. The processor 34a includes a CPU. The memory 34b loads a program to be used by the processor 34a and temporarily stores various types of data. The memory 34b stores signals input from the input device 32 and various types of data acquired by the remote facility 3.

The various types of data include the image data IMG in the communication data COM2. The interface 34c is an interface with external devices such as the input device 32.

1-2-3. Functional Configuration Example of Control Device

Figure 10:
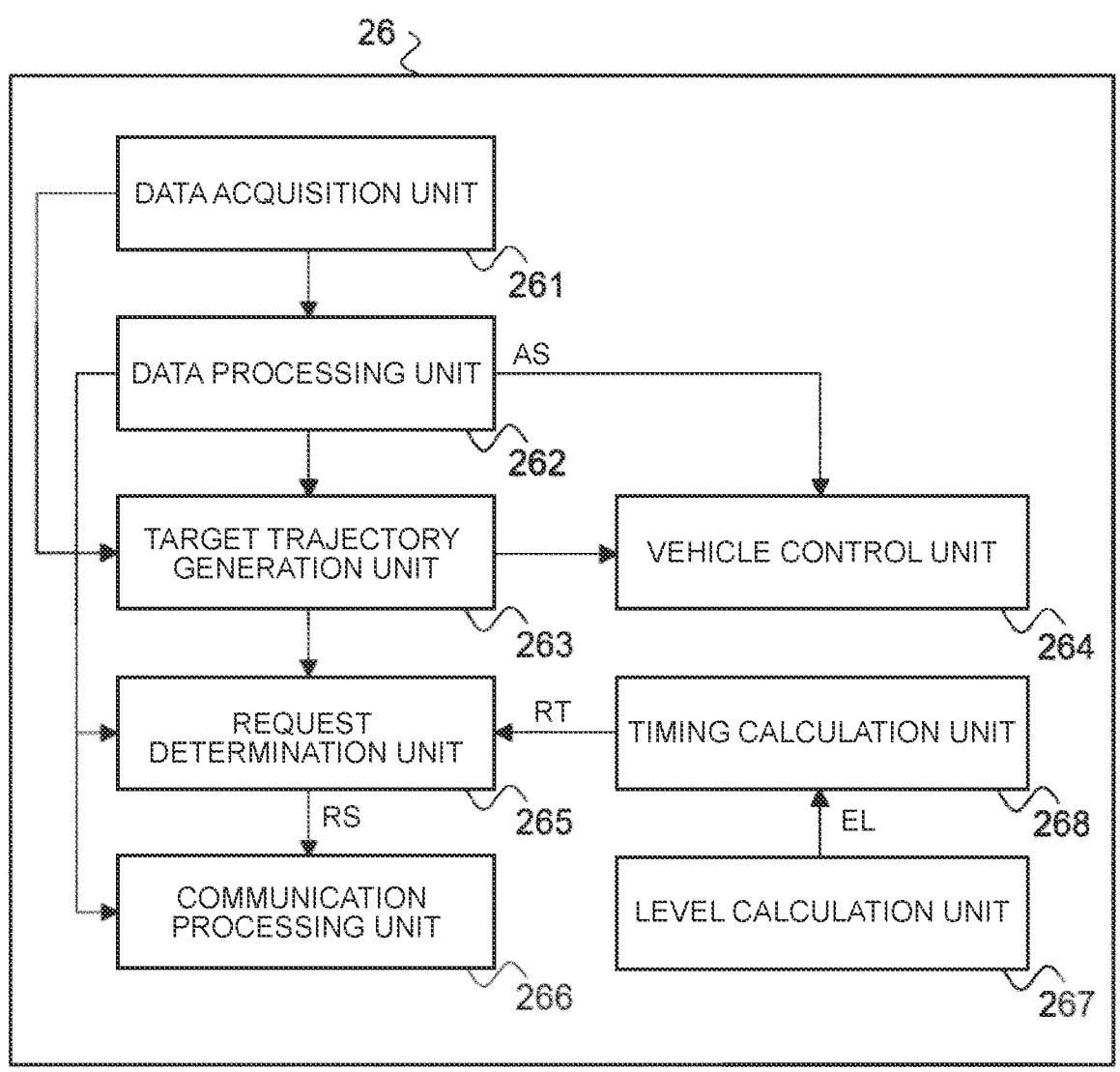
FIG. 10 is a block diagram illustrating a functional configuration example of a vehicle control device shown in FIG. 7.

FIG. 10 is a block diagram illustrating a functional configuration example of the control device 26 illustrated in FIG. 7. As illustrated in FIG. 10, the control device 26 includes a data acquisition unit 261, a data processing unit 262, a target trajectory generation unit 263, a vehicle control unit 264, a request determination unit 265, a communication processing unit 266, a level calculation unit 267, and a timing calculation unit 268. These functions are implemented by the processor 26a processing a predetermined program stored in the memory 26b.

The data acquisition unit 261 acquires the driving environment data ENV. An example of the driving environment data ENV is described in FIG. 8. The data acquisition unit 261 also acquires the communication data COM3. As described above, the communication data COM3 is data transmitted from the remote facility 3 to the vehicle 2. The data acquisition unit 261 also acquires the map data MAP from the map database 23.

The data processing unit 262 processes various types of data acquired by the data acquisition unit 261. Examples of the processes for various types of data include a target recognition process based on the external condition data EXT. According to the recognition process, a target such as a moving object around the vehicle 2 and a lane marking line (white line) is recognized. The processes for various types of data include a calculation process for a future trajectory of the moving object recognized through the recognition process based on the behavior model and the moving object.

The processes for various types of data include an encoding process for the image data IMG and the request signal RS. The encoded image data IMG and the encoded request signal RS are included in the communication data COM2. The processes for various types of data include a decoding process for the assistance signal AS in the communication data COM3. The processes for various types of data may include a calculation process for the possible cruising distance based on the internal condition data INT. The processes for various types of data may include a calculation process for the delay period from the scheduled operation time based on the operating condition data SER.

The target trajectory generation unit 263 generates a target trajectory. For example, the target trajectory is generated based on a target recognized through the recognition process of the data processing unit 262 and various types of data (condition data and position/orientation data of the vehicle 2) acquired by the data acquisition unit 261. The target trajectory is output to the vehicle control unit 264 and the request determination unit 265.

The vehicle control unit 264 performs the autonomous driving control for the vehicle 2 based on the target trajectory. In the autonomous driving control, the steering, acceleration, and deceleration of the vehicle 2 are controlled so that the vehicle 2 follows a target trajectory TR2. To cause the vehicle 2 to follow the target trajectory, the vehicle control unit 264 calculates a deviation (for example, lateral deviation, yaw angle deviation, or speed deviation) between the vehicle 2 and the target trajectory. Then, the vehicle control unit 264 controls the steering, acceleration, and deceleration of the vehicle 2 to reduce the deviation. The vehicle control unit 264 also controls the steering, acceleration, and deceleration of the vehicle 2 based on the assistance signal AS.

The request determination unit 265 determines whether the remote assistance is necessary. For example, this determination is made based on the likelihood of an avoidance target recognized through the recognition process of the data processing unit 262 (hereinafter referred to also as "recognition likelihood"). Alternatively, this determination is made based on the recognition likelihood of a target around the avoidance target. The recognition likelihood is a numerical value indicating certainty of an output in target recognition using deep learning. Specific examples of the recognition likelihood include an index of a target classification result of deep learning using a You Only Look Once (YOLO) network. The index is output together with the classification result. The method for calculating the recognition likelihood that is applicable to the first embodiment is not particularly limited. When the recognition likelihood is lower than a threshold TH1, determination is made that the remote assistance is necessary.

In another example, determination is made as to whether the remote assistance is necessary based on the target trajectory. For example, when a distance from the target trajectory to a lane marking line of a lane where the vehicle 2 travels is smaller than a threshold TH2, determination is made that the safety of the target trajectory is not guaranteed. Also when the collision conditions (see the description in FIG. 3) are satisfied for the target trajectory, determination is made that the safety of the target trajectory is not guaranteed. In such a case, determination is made that the remote assistance is necessary.

The communication processing unit 266 transmits the image data IMG and the request signal RS encoded by the data processing unit 262 to the remote facility 3 via the communication device 25.

The level calculation unit 267 calculates the traveling efficiency level EL. For example, the traveling efficiency level EL is calculated by using Equation (1) with the driving environment data ENV given as a variable.

$$EL = \Sigma Wk \times fk(ENV) \quad (1)$$

In Equation (1), Wk (k≥1) is a weighting coefficient given based on the type of the driving environment data ENV to be used for calculating the traveling efficiency level EL.

A first example of the driving environment data ENV to be used for calculating the traveling efficiency level EL is recognition data of a succeeding vehicle in the external condition data EXT. The succeeding vehicle is a vehicle that travels behind the vehicle 2 in the same direction as the traveling direction of the vehicle 2. The recognition data of the succeeding vehicle may be acquired by the recognition sensor or by processing image data behind the vehicle 2.

For example, when the recognition data of the succeeding vehicle is not included in the external condition data EXT, the value of the function fk(ENV) is set to "V1". Otherwise, the value is set larger than V1. Then, the value of the traveling efficiency level EL to be calculated when the recognition data of the succeeding vehicle is included in the external condition data EXT increases.

The temporary stop at the expected waiting position WP may hinder passage of the succeeding vehicle. In this respect, such a problem can be avoided when the value of the traveling efficiency level EL increases. When the recognition data of the succeeding vehicle is not included in the external condition data EXT, the value of the traveling efficiency level EL may be reduced to permit the temporary stop.

A second example of the driving environment data ENV to be used for calculating the traveling efficiency level EL is boarding data in the internal condition data INT. For example, when the boarding data is not included in the internal condition data INT, the value of the function fk(ENV) is set to "V2". Otherwise, the value is set larger than V2. Then, the value of the traveling efficiency level EL to be calculated when the boarding data is included in the internal condition data INT increases.

The temporary stop at the expected waiting position WP may give a sense of discomfort to the occupant of the vehicle 2. In this respect, the comfort of the occupant can be kept when the value of the traveling efficiency level EL increases. When the boarding data is not included in the internal condition data INT, the value of the traveling efficiency level EL may be reduced to permit the temporary stop.

A third example of the driving environment data ENV to be used for calculating the traveling efficiency level EL is data on the possible cruising distance in the internal condition data INT. For example, when the possible cruising distance is larger than a threshold TH3, the value of the function fk(ENV) is set to "V3". Otherwise, the value is set larger than V3. Then, the value of the traveling efficiency level EL to be calculated when the possible cruising distance is smaller than the threshold TH3 increases.

The temporary stop at the expected waiting position WP may reduce the possible cruising distance. In this respect, the reduction in the possible cruising distance along with the temporary stop can be suppressed when the value of the traveling efficiency level EL increases. When the possible cruising distance has an allowance, the value of the traveling efficiency level EL may be reduced to permit the temporary stop. In the third example, the value of the function fk(ENV) may be changed to increase as the possible cruising distance decreases.

A fourth example of the driving environment data ENV to be used for calculating the traveling efficiency level EL is data on the delay period in the operating condition data SER. For example, when the delay period is smaller than a threshold TH4, the value of the function fk(ENV) is set to "V4". Otherwise, the value is set larger than V4. Then, the value of the traveling efficiency level EL to be calculated when the delay period is larger than the threshold TH4 increases.

The temporary stop at the expected waiting position WP may increase the delay period. In this respect, the increase in the delay period along with the temporary stop can be suppressed when the value of the traveling efficiency level EL increases. When the delay period is larger than the threshold TH4, the value of the traveling efficiency level EL may be reduced to permit the temporary stop. In this example, the value of the function fk(ENV) may be changed to increase as the delay period increases.

A fifth example of the driving environment data ENV to be used for calculating the traveling efficiency level EL is data on the reward in the operating condition data SER. For example, when the reward is smaller than a threshold TH5, the value of the function fk(ENV) is set to "V5". Otherwise, the value is set larger than V5. Then, the value of the traveling efficiency level EL to be calculated when more reward is given increases.

The temporary stop at the expected waiting position WP may give a sense of discomfort to a user who expects efficient transportation. In this respect, the comfort of the user can be kept when the value of the traveling efficiency level EL increases. When the reward is smaller than the threshold TH5, the value of the traveling efficiency level EL may be reduced to permit the temporary stop. In this example, the value of the function fk(ENV) may be changed to increase as the reward increases.

A sixth example of the driving environment data ENV to be used for calculating the traveling efficiency level EL is traffic jam data in the traffic condition data TRA. For example, when the traffic jam data is not included in the traffic condition data TRA, the value of the function fk(ENV) is set to "V6". Otherwise, the value is set larger than V6. Then, the value of the traveling efficiency level EL to be calculated when a traffic jam occurs on a route from a current location of the vehicle 2 to a destination increases.

The temporary stop at the expected waiting position WP may delay the time of arrival at the destination in combination with the traffic jam. In this respect, the delay in the arrival time can be minimized when the value of the traveling efficiency level EL increases. When the traffic jam data is not included in the traffic condition data TRA, the value of the traveling efficiency level EL may be reduced to permit the temporary stop.

A seventh example of the driving environment data ENV to be used for calculating the traveling efficiency level EL is data on an estimated period in the traffic condition data TRA. For example, when the estimated period is smaller than a threshold TH6, the value of the function fk(ENV) is set to "V7". Otherwise, the value is set larger than V7. Then, the value of the traveling efficiency level EL to be calculated when the estimated period is larger than the threshold TH6 increases. The advantage in the seventh example is basically the same as that in the sixth example.

The first to seventh examples of the driving environment data ENV can be combined as appropriate.

The timing calculation unit 268 calculates a timing to transmit the request signal RS (that is, the request timing RT). The request timing RT is expressed as "X seconds after current timing". For example, the request timing RT is calculated based on Equation (2).

$$X = Y - TC + WT \quad (2)$$

In Equation (2), Y is a timing when the vehicle 2 reaches the expected waiting position WP, and is expressed as "Y seconds after current timing". The reach timing "Y" can be calculated based on the target trajectory TR. In Equation (2), TC is a period required from the transmission of the request signal RS to the reception of the assistance signal AS transmitted in response to the request signal RS. The required period TC is separately set based on a communication speed factor such as a communication standard and a frequency band in use.

The waiting period WT is calculated based on the relationship between the traveling efficiency level EL and the waiting period WT in FIG. 6. The waiting period WT is calculated by applying the traveling efficiency level EL calculated by the level calculation unit 267 to the relationship in FIG. 6.

When the waiting period WT is longer than the required period TC (WT>TC), the request timing RT is calculated as a timing delayed by a difference between these periods. When the waiting period WT is equal to the required period TC, the request timing RT agrees with the reach timing. When the waiting period WT is shorter than the required period TC (WT<TC), the request timing RT is calculated as a timing earlier by a difference between these periods.

An upper limit and a lower limit may be set for "X" representing the request timing RT. The upper limit is set to prevent the request timing RT from being delayed excessively. The lower limit is set to prevent the request timing RT from being set too early. In some embodiments, the upper limit of "X" is Y+10 seconds. This means that, when the request timing RT is on the upper limit constraint, the request signal RS is transmitted 10 seconds after the reach timing. In some embodiments, the lower limit of "X" is one second. This means that, when the request timing RT is on the lower limit constraint, the request signal RS is transmitted one second after the current timing.

1-2-4. Processing Example

Figure 11:
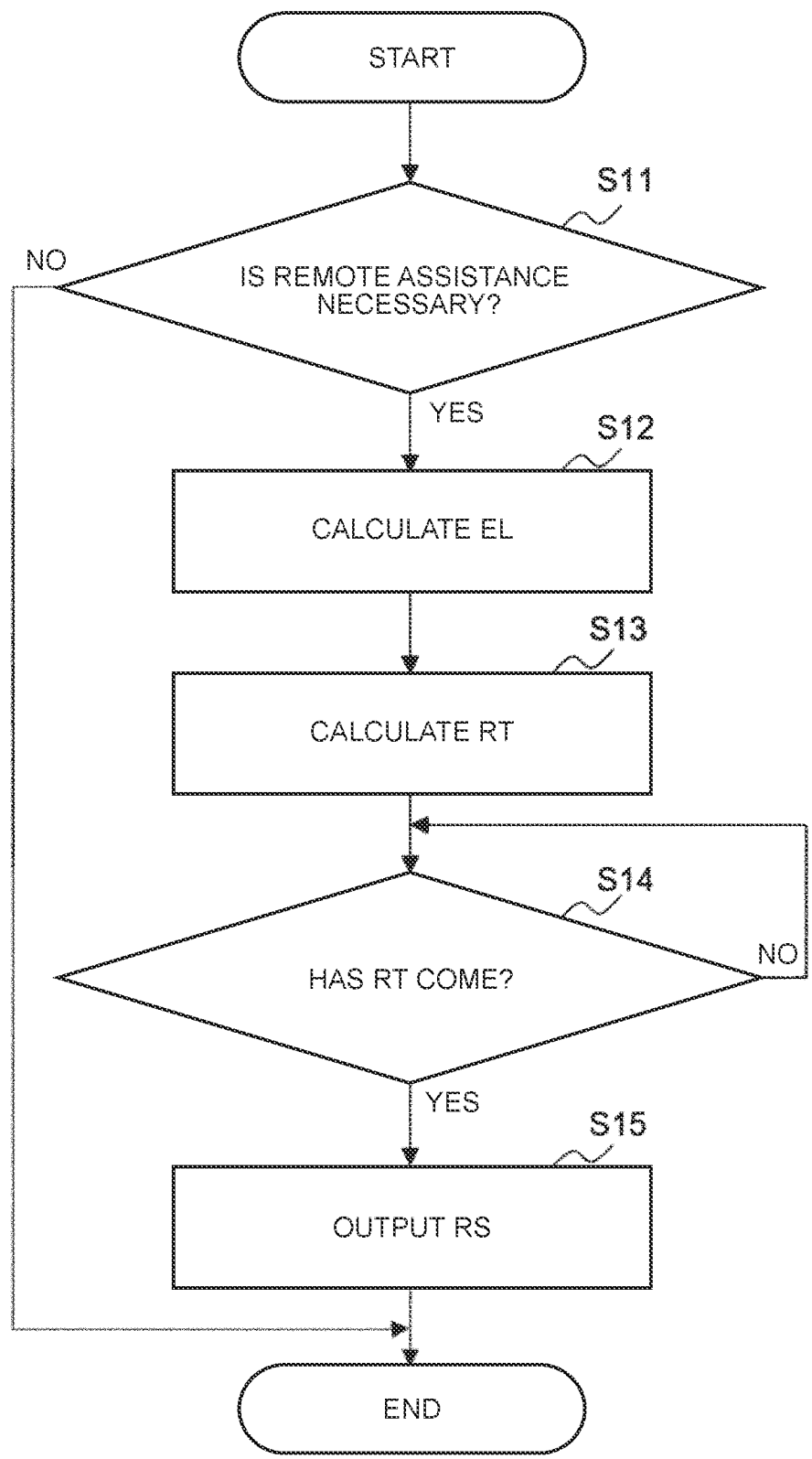
FIG. 11 is a flowchart illustrating an example of processes to be performed by the vehicle control device (processor) during the autonomous driving control in the first embodiment.

FIG. 11 is a flowchart illustrating an example of processes to be performed by the control device 26 (processor 26a) during the autonomous driving control in the first embodiment. The routine illustrated in FIG. 11 is repeated in a predetermined control cycle.

In the routine illustrated in FIG. 11, determination is first made as to whether the remote assistance is necessary (Step S11). The determination of whether the remote assistance is necessary is made based on the external condition data EXT or the target trajectory. In the determination based on the external condition data EXT, the recognition likelihood of an avoidance target or the recognition likelihood of a target around the avoidance target is compared with the threshold TH1. When any recognition likelihood is lower than the threshold TH1, determination is made that the remote assistance is necessary. In the determination based on the target trajectory, determination is made as to whether the collision conditions are satisfied for the target trajectory. When determination is made that the collision conditions are satisfied, determination is made that the remote assistance is necessary.

When the determination result in Step S11 is negative, the processes of this routine are terminated. When the determination result is positive, the traveling efficiency level EL is calculated (Step S12). For example, the traveling efficiency level EL is calculated by using the driving environment data ENV and Equation (1). The example of the driving environment data ENV to be used for the calculation has already been described.

Subsequently to the process of Step S12, the request timing RT is calculated (Step S13). For example, the request timing RT is calculated by using Equation (2). Variables of Equation (2) are the reach timing "Y" and the waiting period WT. The former is calculated based on the target trajectory TR. The latter is calculated by using the traveling efficiency level EL calculated in the process of Step S12. For example, the waiting period WT is calculated by referring to a map showing the relationship between the traveling efficiency level EL and the waiting period WT in FIG. 6 or through calculation using a model expression representing this relationship. The map and the model expression may be set or formulated in advance.

Subsequently to the process of Step S13, determination is made as to whether the request timing RT has come (Step S14). The request timing RT is counted immediately after the calculation of the request timing RT. The process of Step S14 is repeated until the request timing RT comes.

In the process of Step S14, determination may be made as to whether the vehicle 2 has reached the request position RP. The request position RP can be determined when the request timing RT is calculated in the process of Step S13. By determining whether the vehicle 2 has reached the request position RP, determination can substantially be made as to whether the request timing RT has come. For example, the determination of whether the vehicle 2 has reached the request position RP is made based on the position/orientation data POS of the vehicle 2 and the request position RP.

When the determination result in Step S14 is positive, the request signal RS is output (Step S15). When outputting the request signal RS, the request signal RS is encoded. The encoded request signal RS is transmitted to the remote facility 3 via the communication device 25.

1-3. Effects

According to the first embodiment, when determination is made that the remote assistance is necessary, the traveling efficiency level EL is calculated based on the driving environment data ENV. Then, the timing to transmit the request signal RS (that is, the request timing RT) is calculated based on the traveling efficiency level EL. When the request timing RT has come, the request signal RS is transmitted to the remote facility 3. Therefore, it is possible to receive the assistance signal AS by transmitting the request signal RS at the optimum request timing RT set in consideration of the driving environment. Thus, both the operator who provides the remote assistance and the vehicle 2 (or the occupant of the vehicle 2) that receives the remote assistance can attain the advantages of the traveling efficiency level EL.

2. Second Embodiment

Next, a second embodiment of the present disclosure will be described with reference to FIGS. 12 to 14. Descriptions overlapping those in the first embodiment will be omitted as appropriate.

2-1. Outline of Second Embodiment

Figure 12:
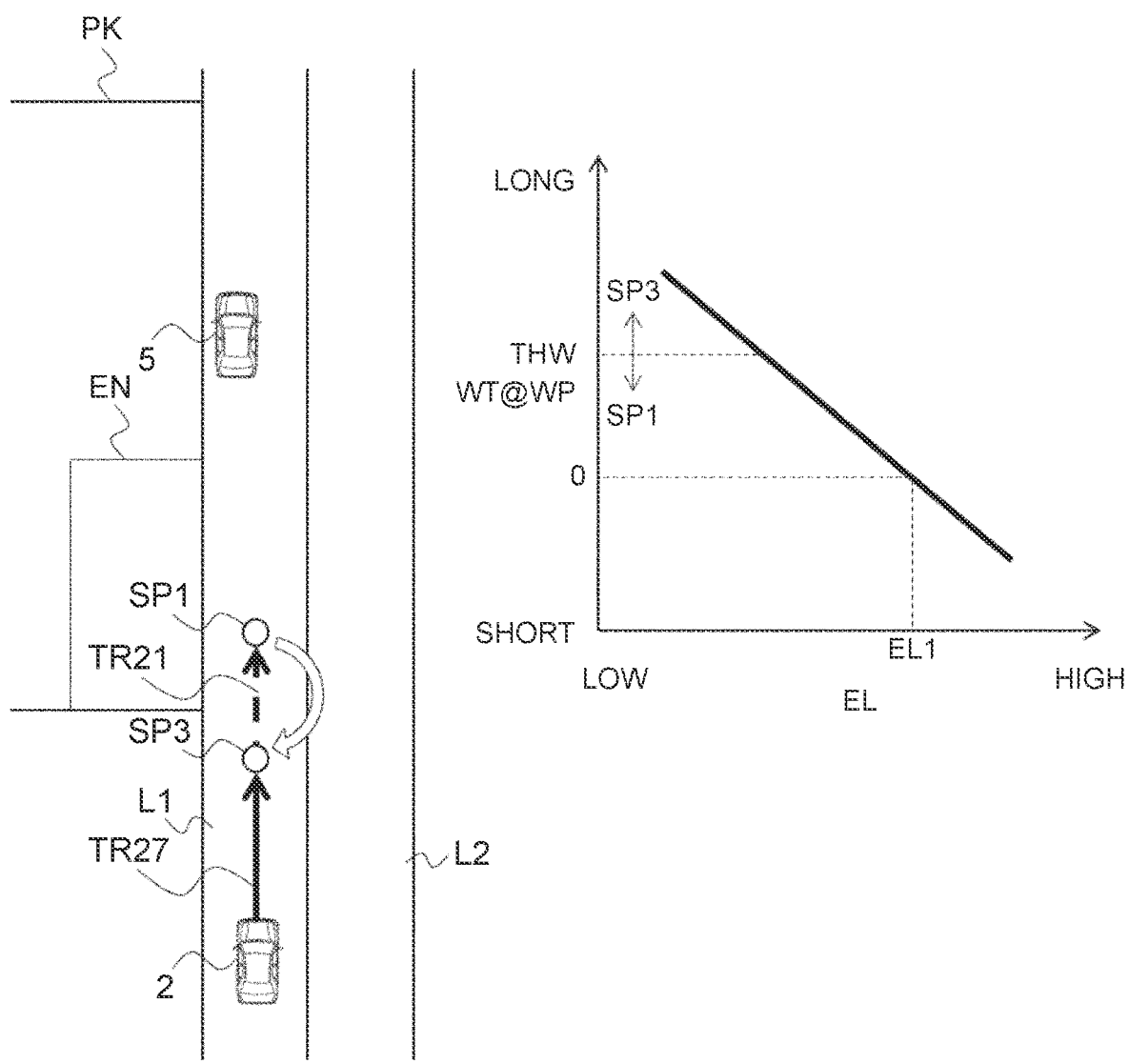
FIG. 12 is a diagram illustrating an outline of a second embodiment.

FIG. 12 is a diagram illustrating an outline of the second embodiment. FIG. 12 illustrates the same situation as that in FIG. 2. FIGS. 2 and 12 differ from each other in terms of a target trajectory TR27. The target trajectory TR27 is a target trajectory for the vehicle 2 to temporarily stop behind the stop position SP1. A stop position SP3 is a target position corresponding to the distal end of the target trajectory TR27.

In the example of FIG. 2, the stop position SP1 is set as the expected waiting position WP. The waiting period WT is calculated based on the expected waiting position WP. A relationship at a right part of FIG. 12 is identical to the example of the relationship between the traveling efficiency level EL and the waiting period WT in FIG. 2.

According to the first embodiment, the waiting period WT is set to increase as the traveling efficiency level EL decreases. Therefore, when the waiting period WT is long, there is a strong possibility that the vehicle 2 temporarily stops at the expected waiting position WP. In this case, the expected waiting position WP may be inappropriate as the temporary stop position due to the long temporary stop period. FIG. 12 illustrates this situation.

In the example illustrated in FIG. 12, a parking facility PK adjoins the lane L1. The stop position SP1 is in front of an entrance/exit area EN of the parking facility PK. When the stop position SP1 is in front of the entrance/exit area EN, the stop position SP1 hinders passage of vehicles exiting or entering the parking facility PK. Depending on the temporary stop period at the expected waiting position WP, the stop position SP1 serving as the expected waiting position WP may be inappropriate as the temporary stop position.

In view of such a problem, determination is made in the second embodiment as to whether the waiting period WT is larger than a threshold THW. The threshold THW can be set as a permissible temporary stop period at the expected waiting position WP (for example, five seconds). When the waiting period WT is larger than the threshold THW, determination is made as to whether the expected waiting position WP is appropriate as the temporary stop position. The determination of whether the expected waiting position WP is appropriate as the temporary stop position can be made based on at least one of the external condition data EXT (specifically, the image data IMG) and the map data MAP.

When determination is made that the expected waiting position WP is inappropriate as the temporary stop position, the target trajectory is generated again. The target trajectory TR27 illustrated in FIG. 12 is the target trajectory generated again. The target trajectory TR27 includes the stop position SP3 appropriate as the temporary stop position.

According to the second embodiment, it is possible to generate the target trajectory including the expected waiting position WP appropriate as the temporary stop position. Even if the waiting period WT calculated based on the traveling efficiency level EL is long, it is possible to avoid the traffic hindrance due to the temporary stop of the vehicle 2 at the expected waiting position WP.

A vehicle control system according to the second embodiment will be described below in detail.

2-2. Vehicle Control System

2-2-1. Functional Configuration Example of Control Device

Figure 13:
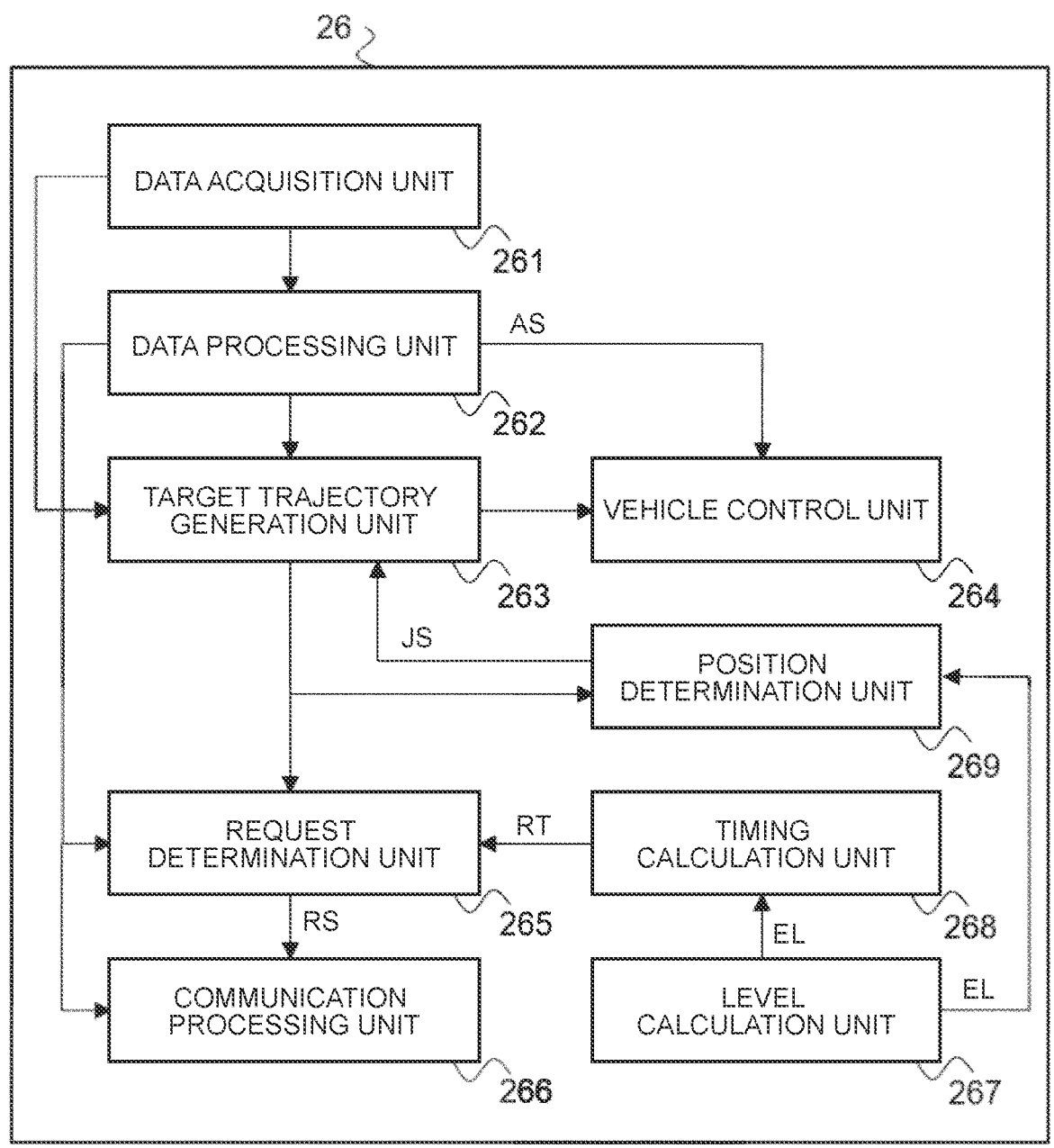
FIG. 13 is a block diagram illustrating a functional configuration example of a control device in a vehicle control system according to the second embodiment.

FIG. 13 is a block diagram illustrating a functional configuration example of a control device in the vehicle control system according to the second embodiment. As illustrated in FIG. 13, a control device 26 includes a data acquisition unit 261, a data processing unit 262, a target trajectory generation unit 263, a vehicle control unit 264, a request determination unit 265, a communication processing unit 266, a level calculation unit 267, a timing calculation unit 268, and a position determination unit 269. These functions are implemented by a processor 26a processing a predetermined program stored in a memory 26b.

The functional blocks other than the position determination unit 269 are in common with those in the functional configuration example in FIG. 10. Therefore, the position determination unit 269 will mainly be described below. The position determination unit 269 determines whether the expected waiting position WP is appropriate as the temporary stop position. In this determination, the waiting period WT is first calculated. The waiting period WT is calculated by applying the traveling efficiency level EL calculated by the level calculation unit 267 to the relationship in FIG. 6.

The position determination unit 269 subsequently determines whether the waiting period WT is larger than the threshold THW. When determination is made that the waiting period WT is larger than the threshold THW, the position determination unit 269 recognizes a target around the expected waiting position WP and/or acquires position data of an intersection and a structure around the expected waiting position WP based on at least one of the external condition data EXT (specifically, the image data IMG) and the map data MAP.

Through the target recognition process using the image data IMG, the target around the expected waiting position WP is recognized. With the map data MAP, the position data of the intersection and the structure around the expected waiting position WP is acquired. The position determination unit 269 determines the appropriateness of the expected waiting position WP based on the recognized target and the acquired position data.

Examples of inappropriate positions include the entrance/exit area EN described in FIG. 12, the intersection PI described in FIG. 3, and a crosswalk. When determination is made that the expected waiting position WP is inappropriate, the position determination unit 269 outputs a determination signal JS including a correction instruction for the target trajectory to the target trajectory generation unit 263. When determination is made that the expected waiting position WP is appropriate, the position determination unit 269 outputs a determination signal JS including an output instruction for the target trajectory to the target trajectory generation unit 263.

When the target trajectory generation unit 263 receives the determination signal JS including the correction instruction, the target trajectory generation unit 263 generates the target trajectory again. For example, the target trajectory is generated again by setting a new stop position behind the stop position included in the previous target trajectory. The target trajectory is repeatedly generated again until the determination signal JS including the output instruction is received. When the determination signal JS including the output instruction is received, the target trajectory generation unit 263 outputs the target trajectory under the output instruction to the vehicle control unit 264 and the request determination unit 265.

2-2-2. Processing Example

Figure 14:
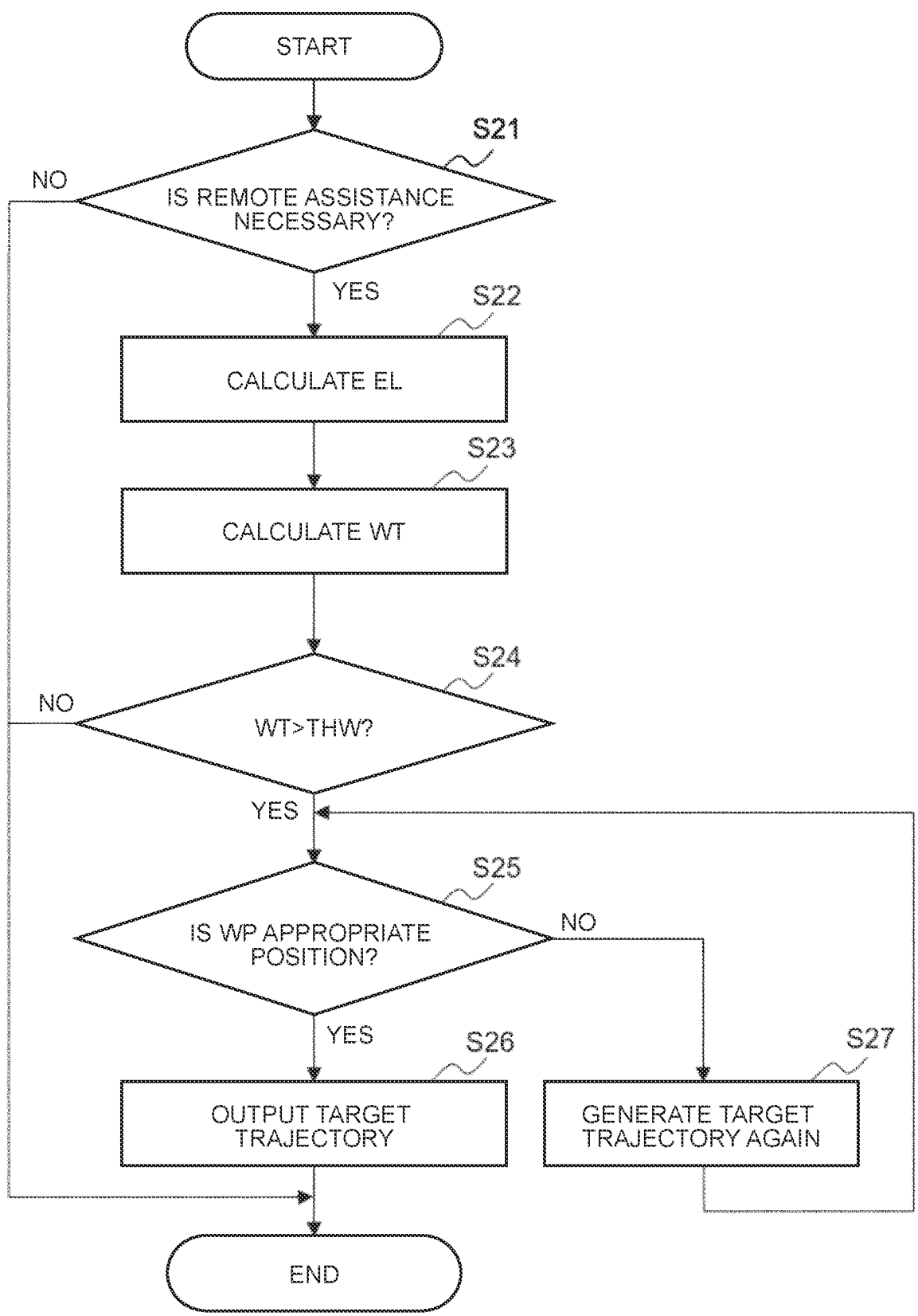
FIG. 14 is a flowchart illustrating an example of processes to be performed by the vehicle control device (processor) during autonomous driving control in the second embodiment.

FIG. 14 is a flowchart illustrating an example of processes to be performed by the control device 26 (processor 26a) during the autonomous driving control in the second embodiment. The routine illustrated in FIG. 14 is repeated in a predetermined control cycle similarly to the routine illustrated in FIG. 11.

In the routine illustrated in FIG. 14, processes of Steps S21 and S22 are performed. Details of the processes of Steps S21 and S22 are identical to those of the processes of Steps S11 and S12 described with reference to FIG. 11.

Subsequently to the process of Step S22, the waiting period WT is calculated (Step S23). The waiting period WT is calculated by using the traveling efficiency level EL calculated in Step S22. For example, the waiting period WT is calculated by referring to a map showing the relationship between the traveling efficiency level EL and the waiting period WT in FIG. 6 or through calculation using a model expression representing this relationship. The map and the model expression may be set or formulated in advance.

Subsequently to the process of Step S23, determination is made as to whether the waiting period WT is larger than the threshold THW (Step S24). In the process of Step S24, the waiting period WT calculated through the process of Step S23 is compared with the threshold THW. As described above, the threshold THW is set as the permissible temporary stop period at the expected waiting position WP.

When the determination result in Step S24 is negative, the processes of this routine are terminated. When the determination result is positive, determination is made as to whether the expected waiting position WP corresponds to an appropriate position (Step S25). In the process of Step S25, the expected waiting position WP is first determined based on the target trajectory TR. Subsequently, a target around the expected waiting position WP is recognized based on the image data IMG. Alternatively, position data of an intersection and a structure around the expected waiting position WP is acquired based on the map data MAP.

The appropriateness of the expected waiting position WP is determined based on the recognized target and the acquired position data. When determination is made that the expected waiting position WP is appropriate, the target trajectory is output (Step S26). When determination is made that the expected waiting position WP is not appropriate, the target trajectory is generated again (Step S27). For example, the target trajectory is generated again by setting a new stop position behind the stop position included in the target trajectory determined as being inappropriate. The processes of Steps S25 and S27 are repeated until a positive determination result is obtained in the process of Step S25.

2-3. Effects

According to the second embodiment, it is possible to generate the target trajectory including the expected waiting position WP appropriate as the temporary stop position. Therefore, it is possible to avoid the traffic hindrance due to the temporary stop of the vehicle 2 at the expected waiting position WP.

What is claimed is:

1. A vehicle control system for a vehicle configured to receive remote assistance from a remote facility during autonomous driving control, the vehicle control system comprising:
 a memory configured to store driving environment data of the vehicle; and
 a processor configured to
  generate a target trajectory of the vehicle based on the driving environment data, and
  execute the autonomous driving control based on the target trajectory, wherein the processor is configured to, as the autonomous driving control,
 determine whether the remote assistance is necessary based on at least one of the driving environment data and the target trajectory,
 generate, when determination is made that the remote assistance is necessary, the target trajectory including an expected waiting position where the vehicle is expected to wait for reception of an assistance signal from the remote facility,
 calculate, based on the driving environment data, a traveling efficiency level indicating a level of traveling efficiency required in the vehicle,
 calculate, based on the traveling efficiency level, a request timing to transmit a request signal for the remote assistance to the remote facility,
 transmit the request signal to the remote facility when the request timing has come, and
 output a late timing when the traveling efficiency level is low in calculation of the request timing, the late timing being later than a fast timing, the fast timing being a timing when the traveling efficiency level is high, wherein:
 the driving environment data has external condition data of the vehicle; and
 the processor is configured to output a high level when the external condition data has recognition data of a succeeding vehicle behind the vehicle in calculation of the traveling efficiency level,
 the high level is higher than a low level, and
 the low level is a level when the external condition data does not include the recognition data of the succeeding vehicle behind the vehicle.

2. The vehicle control system according to claim 1, further comprising a database storing map data, wherein the processor is configured to, as the autonomous driving control:
 calculate, based on the traveling efficiency level, a waiting period to wait for the assistance signal from the remote facility at the expected waiting position;
 determine whether the waiting period is larger than a permissible period;
 determine, when determination is made that the waiting period is larger than the permissible period, whether the expected waiting position is appropriate as a temporary stop position based on at least one of the driving environment data and the map data; and
 generate, when determination is made that the expected waiting position is not appropriate as the temporary stop position, a corrected target trajectory in which the expected waiting position is corrected.

3. The vehicle control system according to claim 1, wherein:
 the driving environment data has internal condition data of the vehicle; and
 the processor is configured to output the high level when the internal condition data has boarding data indicating that an occupant is in the vehicle in calculation of the traveling efficiency level,
 the high level is higher than the low level, and
 the low level is a level when the internal condition data does not have the boarding data indicating that the occupant is in the vehicle.

4. The vehicle control system according to claim 1, wherein:
 the driving environment data has internal condition data of the vehicle;
 the internal condition data has data on a possible cruising distance of the vehicle; and
 the processor is configured to output a higher level as the possible cruising distance decreases in calculation of the traveling efficiency level.

5. The vehicle control system according to claim 1, wherein:
 the driving environment data has operating condition data of a transportation service for a passenger to be provided by the vehicle;
 the operating condition data has data on a delay period from a scheduled operation time of the transportation service; and
 the processor is configured to output a higher level as the delay period increases in calculation of the traveling efficiency level.

6. The vehicle control system according to claim 1, wherein:
 the driving environment data has operating condition data of a transportation service for a passenger to be provided by the vehicle;
 the operating condition data has data on a reward to be given by the passenger for the transportation service; and
 the processor is configured to output a higher level as the reward increases in calculation of the traveling efficiency level.

7. The vehicle control system according to claim 1, wherein:

the driving environment data has traffic condition data on a route from a current location of the vehicle to a destination; and the processor is configured to output the high level when the traffic condition data has data on a traffic jam occurring on the route in calculation of the traveling efficiency level, the high level is higher than the low level, and the low level is a level when the traffic condition data does not have the data on the traffic jam occurring on the route.

8. A vehicle control method for a vehicle configured to receive remote assistance from a remote facility during autonomous driving control, the vehicle control method comprising: by a processor of the vehicle that is configured to generate a target trajectory of the vehicle based on driving environment data of the vehicle, and execute the autonomous driving control based on the target trajectory, determining whether the remote assistance is necessary based on at least one of the driving environment data and the target trajectory;

generating, when determination is made that the remote assistance is necessary, the target trajectory including an expected waiting position where the vehicle is expected to wait for reception of an assistance signal from the remote facility;

calculating, based on the driving environment data, a traveling efficiency level indicating a level of traveling efficiency required in the vehicle;

calculating, based on the traveling efficiency level, a request timing to transmit a request signal for the remote assistance to the remote facility;

transmitting the request signal to the remote facility when the request timing has come; and outputting a late timing when the traveling efficiency level is low in calculation of the request timing, the late timing being later than a fast timing, the fast timing being a timing when the traveling efficiency level is high, wherein:

the driving environment data has external condition data of the vehicle; and the processor is configured to output a high level when the external condition data has recognition data of a succeeding vehicle behind the vehicle in calculation of the traveling efficiency level, the high level is higher than a low level, and the low level is a level when the external condition data does not include the recognition data of the succeeding vehicle behind the vehicle.

9. The vehicle control method according to claim 8, further comprising: by the processor, calculating, based on the traveling efficiency level, a waiting period to wait for the assistance signal from the remote facility at the expected waiting position;

determining whether the waiting period is larger than a permissible period;

determining, when determination is made that the waiting period is larger than the permissible period, whether the expected waiting position is appropriate as a temporary stop position based on at least one of the driving environment data and map data stored in a database; and generating, when determination is made that the expected waiting position is not appropriate as the temporary stop position, a corrected target trajectory in which the expected waiting position is corrected.

10. A vehicle control system for a vehicle configured to receive remote assistance from a remote facility during autonomous driving control, the vehicle control system comprising:

a memory configured to store driving environment data of the vehicle; and a processor configured to generate a target trajectory of the vehicle based on the driving environment data, and execute the autonomous driving control based on the target trajectory, wherein the processor is configured to, as the autonomous driving control, determine whether the remote assistance is necessary based on at least one of the driving environment data and the target trajectory, generate, when determination is made that the remote assistance is necessary, the target trajectory including an expected waiting position where the vehicle is expected to wait for reception of an assistance signal from the remote facility, calculate, based on the driving environment data, a traveling efficiency level indicating a level of traveling efficiency required in the vehicle, calculate, based on the traveling efficiency level, a request timing to transmit a request signal for the remote assistance to the remote facility, transmit the request signal to the remote facility when the request timing has come, and output a late timing when the traveling efficiency level is low in calculation of the request timing, the late timing being later than a fast timing, the fast timing being a timing when the raveling efficiency level is high, wherein:

the driving environment data has internal condition data of the vehicle; and the processor is configured to output a high level when the internal condition data has boarding data indicating that an occupant is in the vehicle in calculation of the traveling efficiency level, the high level is higher than a low level, and the low level is a level when the internal condition data does not have the boarding data indicating that the occupant is in the vehicle.

* * * * *